(12) United States Patent
Hwang et al.

(10) Patent No.: US 9,923,753 B2
(45) Date of Patent: Mar. 20, 2018

(54) METHOD FOR RECEIVING DOWNLINK DATA IN A WIRELESS COMMUNICATION SYSTEM SUPPORTING 256 QAM, AND TERMINAL THEREFOR

(71) Applicant: LG ELECTRONICS INC., Seoul (KR)

(72) Inventors: Daesung Hwang, Seoul (KR); Yunjung Yi, Seoul (KR); Kijun Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/120,731

(22) PCT Filed: Feb. 27, 2015

(86) PCT No.: PCT/KR2015/001930
§ 371 (c)(1),
(2) Date: Aug. 22, 2016

(87) PCT Pub. No.: WO2015/133766
PCT Pub. Date: Sep. 11, 2015

(65) Prior Publication Data
US 2016/0366007 A1 Dec. 15, 2016

Related U.S. Application Data

(60) Provisional application No. 61/949,256, filed on Mar. 7, 2014, provisional application No. 61/968,365, filed
(Continued)

(51) Int. Cl.
*H04W 52/14* (2009.01)
*H04W 52/34* (2009.01)
(Continued)

(52) U.S. Cl.
CPC ............ *H04L 27/3809* (2013.01); *H04L 1/00* (2013.01); *H04L 5/0048* (2013.01);
(Continued)

(58) Field of Classification Search
CPC ... H04W 52/143; H04W 52/04; H04W 52/30; H04W 52/34; H04W 52/36; H04W 72/042
(Continued)

(56) References Cited

U.S. PATENT DOCUMENTS

2010/0238825 A1 9/2010 Zhang et al.
2012/0120860 A1 5/2012 Chui et al.
(Continued)

*Primary Examiner* — Philip Sobutka
(74) *Attorney, Agent, or Firm* — Lee Hong Degerman Kang Waimey

(57) ABSTRACT

One disclosure of the present application provides a method for receiving downlink data in a wireless communication system supporting 256 QAM. The method for receiving downlink data in a wireless communication system supporting 256 QAM comprises the steps of: receiving setting information for power back-off; receiving downlink data transmitted on the basis of the setting information for power back-off; and demodulating the downlink data received on the basis of the setting information for power back-off, wherein the setting information for power back-off is information related to at least one of whether to apply the power back-off, a reduced amount of power of the downlink data by the power back-off, a frame index to which the power back-off is applied, a subframe index and a resource to which the power back-off is applied.

13 Claims, 21 Drawing Sheets

Related U.S. Application Data on Mar. 21, 2014, provisional application No. 61/992,876, filed on May 13, 2014.

(51) Int. Cl.
  *H04L 27/38* (2006.01)
  *H04L 1/00* (2006.01)
  *H04L 27/00* (2006.01)
  *H04W 52/36* (2009.01)
  *H04W 72/04* (2009.01)
  *H04L 5/00* (2006.01)

(52) U.S. Cl.
  CPC ....... *H04L 27/0008* (2013.01); *H04W 52/143* (2013.01); *H04W 52/34* (2013.01); *H04W 52/36* (2013.01); *H04W 72/042* (2013.01); *H04L 5/001* (2013.01); *H04L 5/0091* (2013.01)

(58) Field of Classification Search
  USPC ......................................................... 455/522
  See application file for complete search history.

(56) References Cited

U.S. PATENT DOCUMENTS

| | | | |
|---|---|---|---|
| 2012/0257519 A1* | 10/2012 | Frank | H04L 5/0035 370/252 |
| 2012/0295656 A1 | 11/2012 | Yang et al. | |
| 2013/0017857 A1 | 1/2013 | Chang et al. | |
| 2014/0036827 A1 | 2/2014 | Han et al. | |

\* cited by examiner

FIG. 12
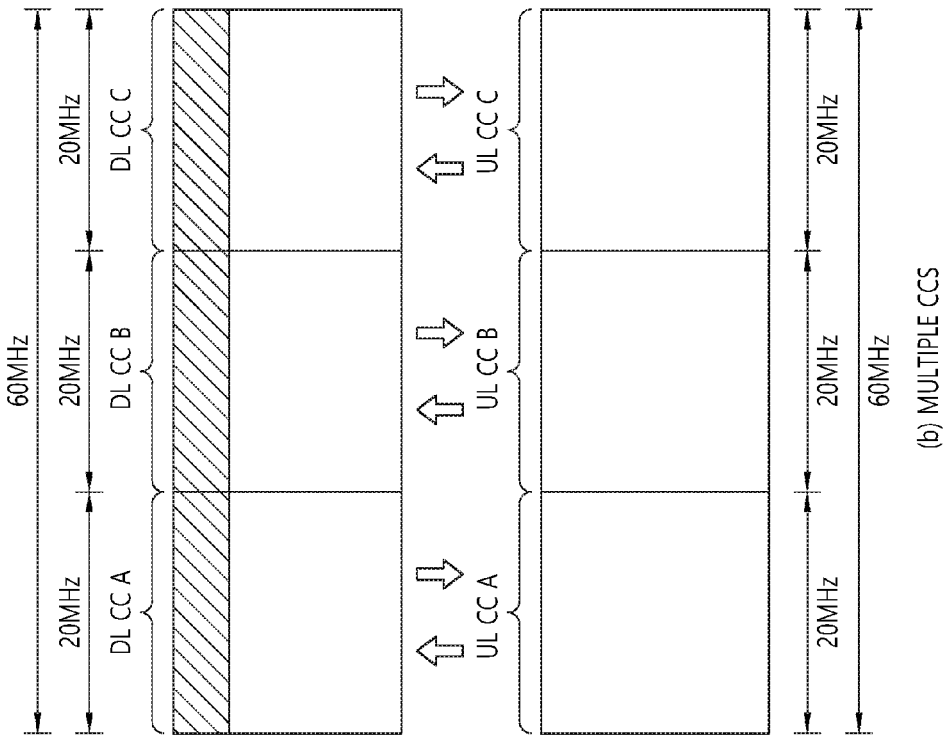
(b) MULTIPLE CCS
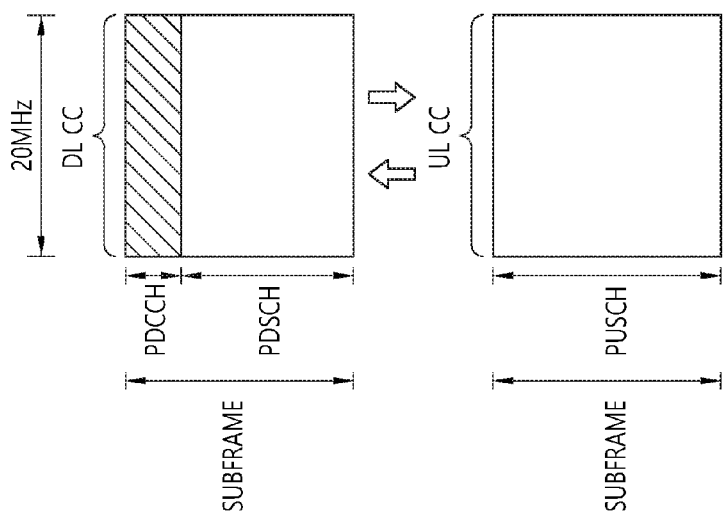
(a) SINGLE CC

Small cell cluster

METHOD FOR RECEIVING DOWNLINK DATA IN A WIRELESS COMMUNICATION SYSTEM SUPPORTING 256 QAM, AND TERMINAL THEREFOR

CROSS-REFERENCE TO RELATED APPLICATIONS

This application is the National Stage filing under 35 U.S.C. 371 of International Application No. PCT/KR2015/001930, filed on Feb. 27, 2015, which claims the benefit of U.S. Provisional Application Nos. 61/949,256, filed on Mar. 7, 2014, 61/968,365, filed on Mar. 21, 2014, and 61/992,876, filed on May 13, 2014, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", 3GPP LTE/LTE-A may divide the physical channel into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

Meanwhile, in a next-generation system, a channel situation for a user equipment (UE) or a terminal like a small cell environment or a next-generation interference management (e.g., network-assisted interference cancellation (NAIC) technique may be considered, which is improved further than the existing environment.

In this case, introducing a high order modulation scheme such as 256 QAM may be considered as a part for improving spectral efficiency.

In terms of hardware implementation, for example, errors may occur in transmitting each modulated symbol at a transmitting end, such as non-linearity and phase distortion of a power amplifier and this is recognized as self interference to influence reducing a substantial signal-to-noise-plus-interference ratio (SINR) at a receiving end.

The influence of the self interference may express an error caused because the corresponding modulated symbol cannot be accurately expressed during transmission/reception in the form of an error vector magnitude (EVM).

Equation 1 given below is an example of the EVM.

$$EVM = \sqrt{\frac{P_{error}}{P_{avg,tx}}} \qquad \text{[Equation 1]}$$

In the above description, Perror represents power for an error vector and Pavg,tx represents average transmit power of the transmitting end.

As a modulation order increases, an Euclidean distance between modulated symbols on a constellation may be reduced, therefore, there may be a problem in that performance deterioration in a system using a high order modulation scheme increases even with respect to the same EVM.

SUMMARY OF THE INVENTION

In an aspect, a method for receiving downlink data in a wireless communication system supporting 256 QAM is provided. The method includes: receiving configuration information for power back-off; receiving the downlink data transmitted based on the configuration information for the power back-off; and demodulating the received downlink data based on the configuration information for the power back-off, wherein the configuration information for the power back-off may be information associated with at least one of whether to apply the power back-off, a power reduction amount of the downlink by the power back-off, a frame index to which the power back-off is applied, a subframe index, and a resource to which the power back-off is applied.

When at least one terminal among a plurality of terminals which communicates with a serving cell is configured to use the 256 QAM, the power back-off may be applied.

When the downlink data is downlink data transmitted to the terminal configured to use the 256 QAM among the plurality of terminals which communicates with the serving cell, the power back-off may be applied.

When the downlink data is downlink data transmitted to the terminal which operates in the 256 QAM among the plurality of terminals which communicates with the serving cell, the power back-off may be applied.

The configuration information for the power back-off may be signaled by a high layer.

A resource to which the power back-off is applied may be a resource acquired by excluding a resource corresponding to a downlink control channel from resources corresponding to the downlink data Herein, the downlink control channel may be at least one of a Physical Control Format Indicator Channel (PCFICH), a Physical Hybrid-ARQ Indicator Channel (PHICH), a Physical Downlink Control Channel (PDCCH), and an enhanced PDCCH (EPDCCH).

The resource to which the power back-off is applied may be a resource acquired by excluding a resource corresponding to a cell-specific signal from the resources corresponding to the downlink data.

Herein, the cell-specific signal may be at least one of a Primary Synchronization Signal (PSS), a Secondary Synchronization Signal (SSS), a Cell-specific Reference Signal (CRS), and a Positioning Reference Signal (PRS).

In another aspect, a terminal for receiving downlink data in a wireless communication system supporting 256 QAM is provided. The terminal includes: an RF unit receiving configuration information for power back-off and downlink data transmitted based on the configuration information for the power back-off; and a processor demodulating the received downlink data based on the configuration information for the power back-off, wherein the configuration information for the power back-off may be information associated with at least one of whether to apply the power back-off, a power reduction amount of the downlink by the power back-off, a frame index to which the power back-off is applied, a subframe index, and a resource to which the power back-off is applied.

According to a disclosure of the present specification, the problem in the related art is solved. In more detail, according to the disclosure of the present specification, power control can be efficiently performed with respect to a case of introducing a new modulation scheme. Further, power back-off is applied to downlink data transmitted by a high order modulation scheme, and as a result, a received SINR is improved.

BRIEF DESCRIPTION OF THE DRAWINGS

FIG. 12 illustrates an example of comparison between a single carrier system and a carrier aggregation system.

DESCRIPTION OF EXEMPLARY EMBODIMENTS

Figure 1:
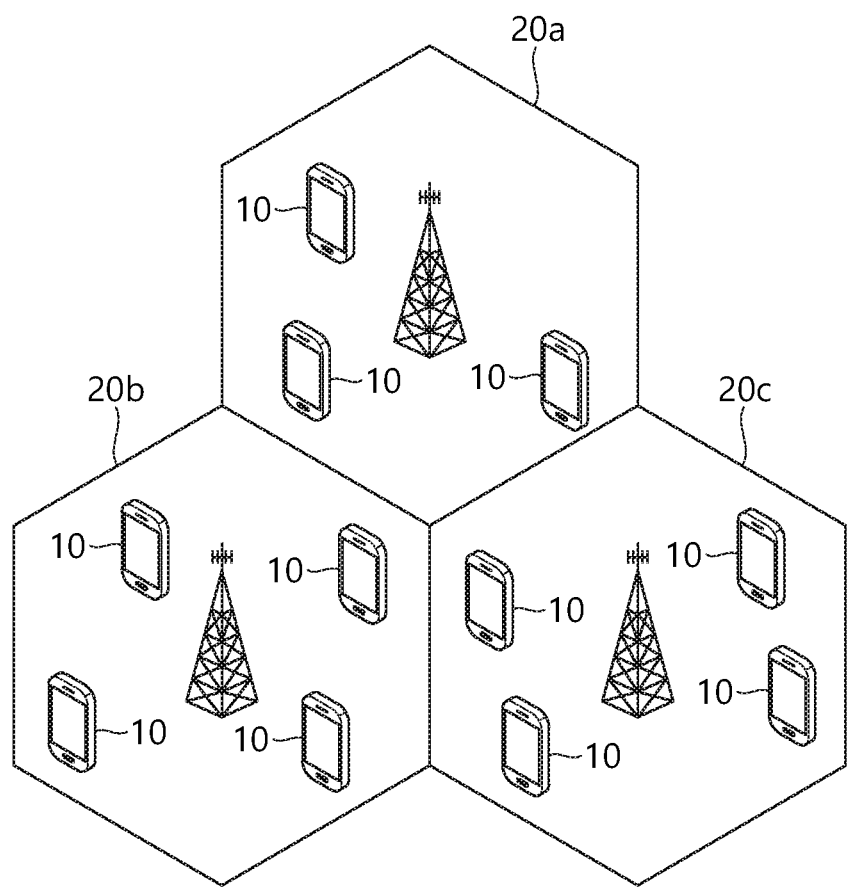
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
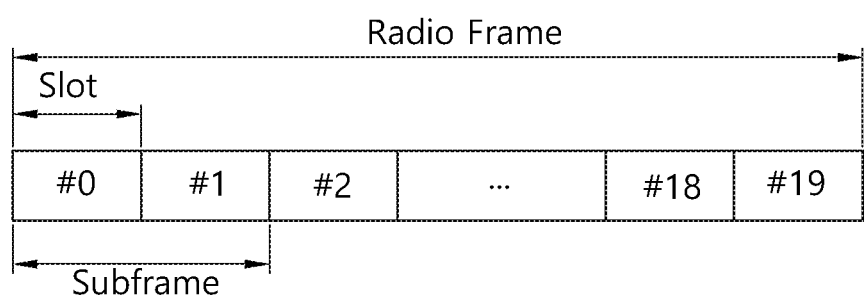
FIG. 2 illustrates a structure of a radio frame according to frequency division duplex (FDD) of 3rd generation partnership project (3GPP) long term evolution (LTE).

FIG. 2 illustrates a structure of a radio frame according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 subframes indexed 0 to 9. One subframe includes two consecutive slots. Accordingly, the radio frame includes 20 slots. The time taken for one subframe to be transmitted is denoted TTI (transmission time interval). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
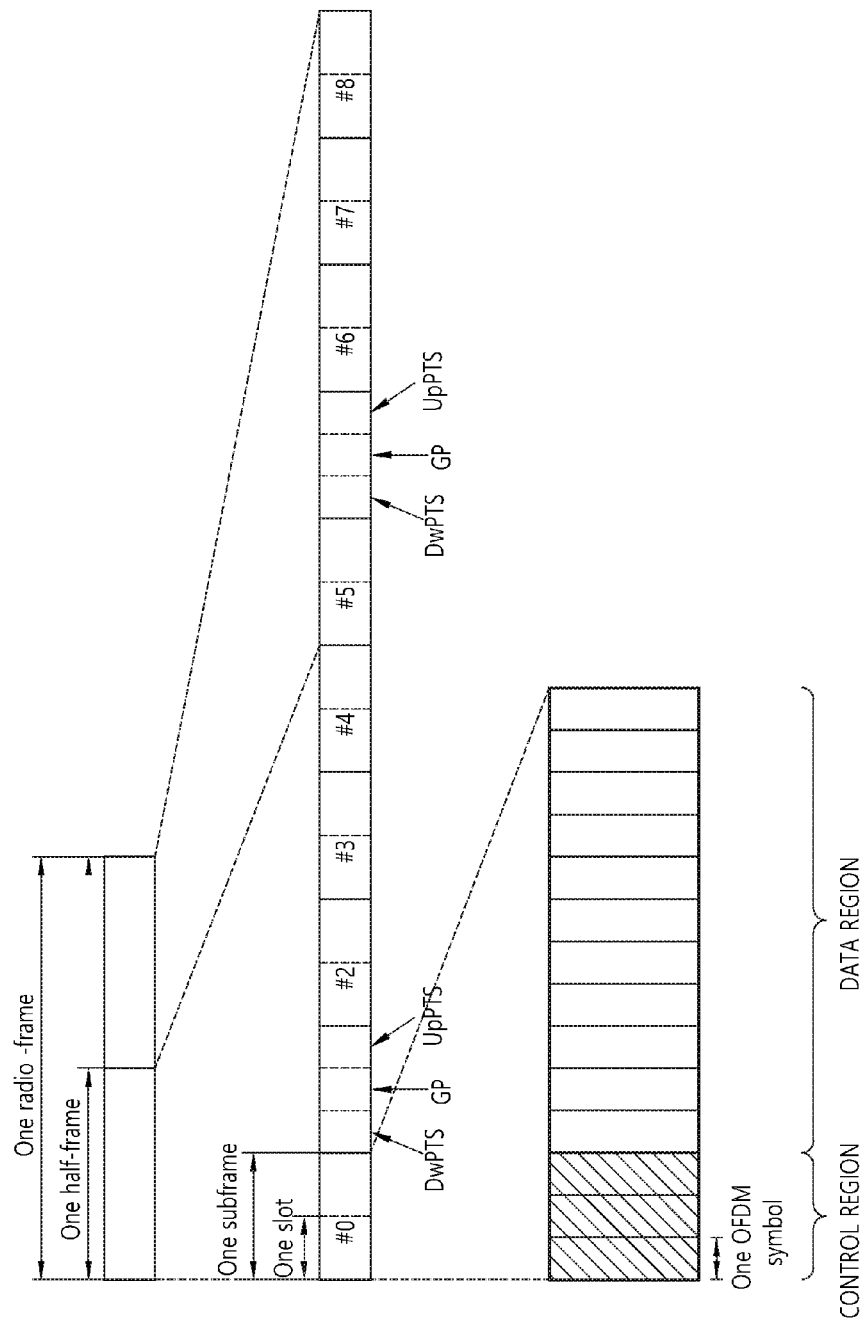
FIG. 3 illustrates a structure of a downlink radio frame according to time division duplex (TDD) in 3GPP LTE.

FIG. 3 illustrates a structure of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Subframes having index #1 and index #6 are denoted special subframes, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) subframe and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' a UL subframe, and 'S' a special subframe. When receiving a UL-DL configuration from the base station, the terminal may be aware of whether a subframe is a DL subframe or a UL subframe according to the configuration of the radio frame.

Figure 4:
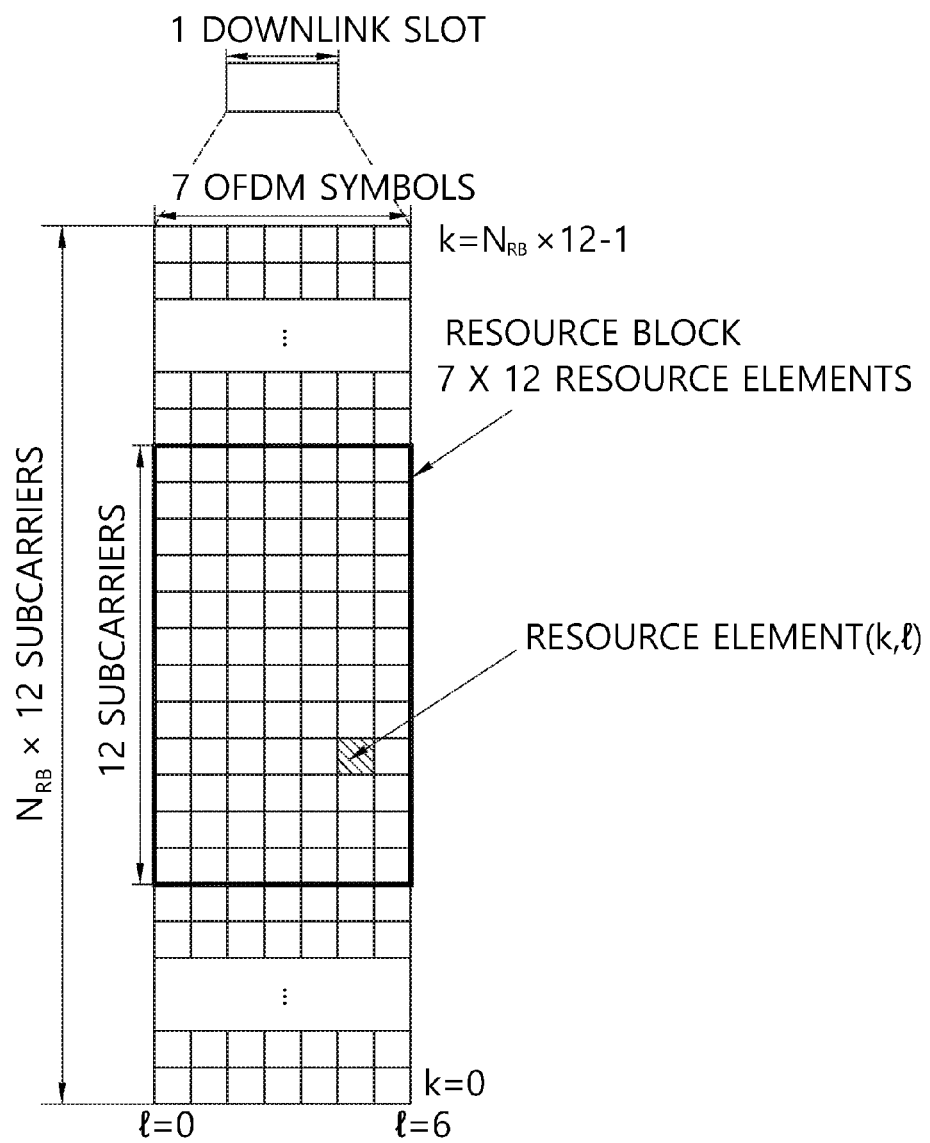
FIG. 4 illustrates an example of a resource grid for one uplink or downlink slot in 3GPP LTE.

FIG. 4 illustrates an example of a resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Figure 5:
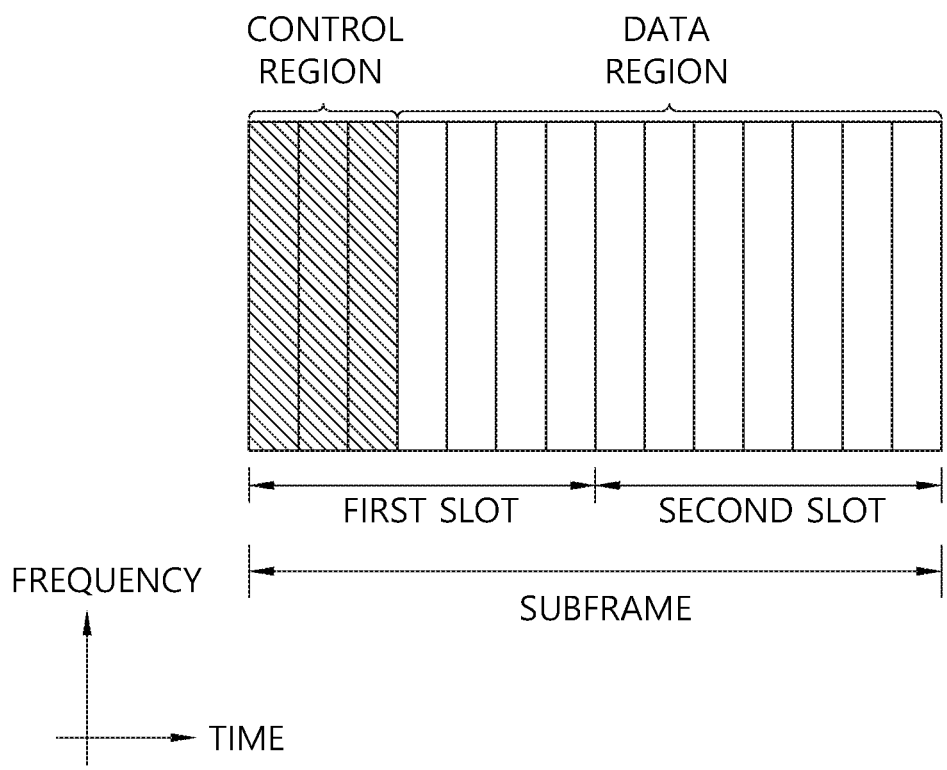
FIG. 5 illustrates a structure of a downlink subframe.

FIG. 5 illustrates a structure of a downlink subframe.

In FIG. 5, assuming the normal CP, one slot includes seven OFDM symbols, by way of example.

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the subframe carries CIF (control format indicator) regarding the number (i.e., size of the control region) of OFDM symbols used for transmission of control channels in the subframe. The wireless device first receives the CIF on the PCFICH and then monitors the PDCCH.

Unlike the PDCCH, the PCFICH is transmitted through a fixed PCFICH resource in the subframe without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first subframe of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

Figure 6:
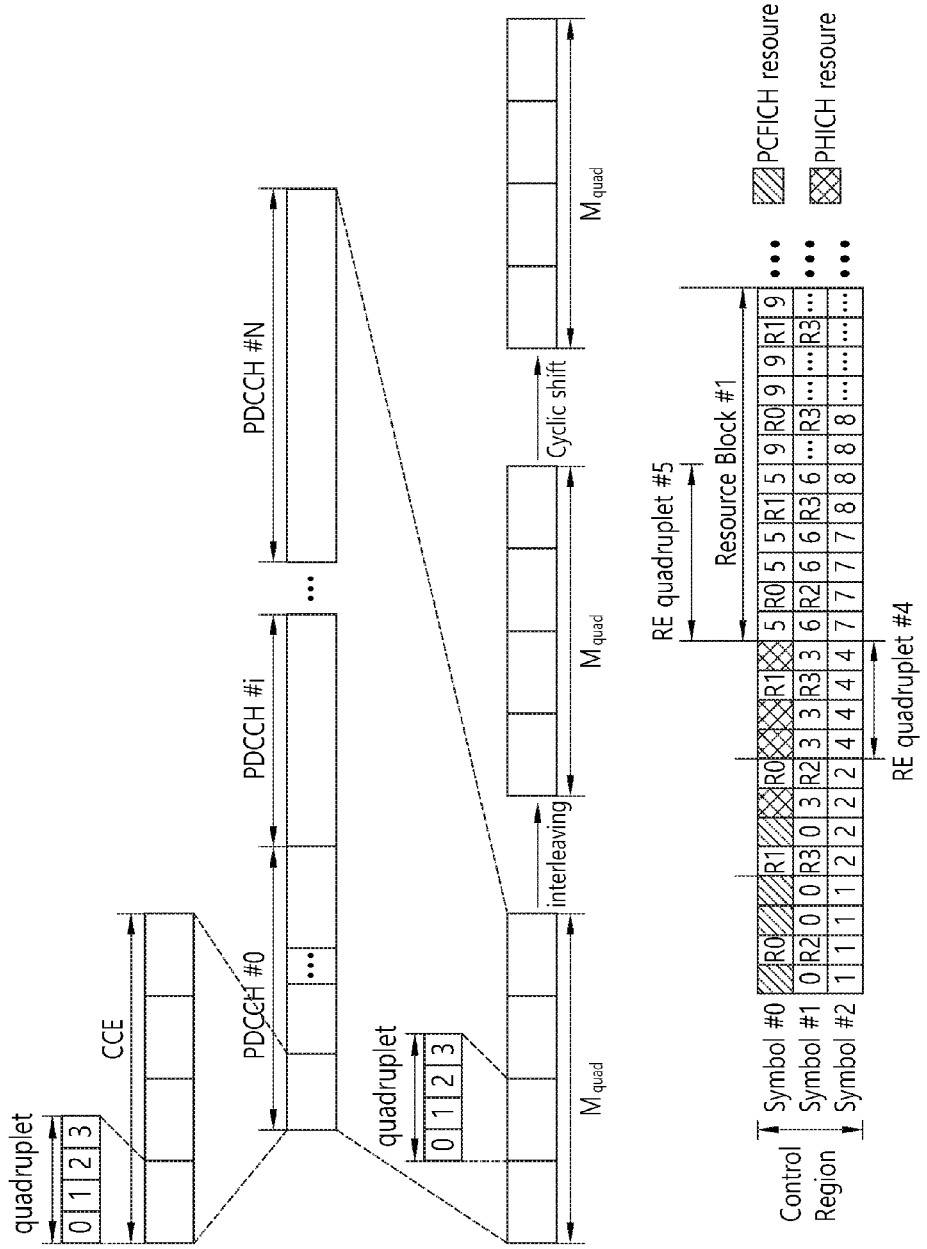
FIG. 6 illustrates an example of resource mapping of a PDCCH.

FIG. 6 illustrates an example of resource mapping of a PDCCH.

R0 denotes a reference signal of a 1st antenna, R1 denotes a reference signal of a 2nd antenna, R2 denotes a reference signal of a 3rd antenna, and R3 denotes a reference signal of a 4th antenna.

A control region in a subframe includes a plurality of control channel elements (CCEs). The CCE is a logical allocation unit used to provide the PDCCH with a coding rate depending on a state of a radio channel, and corresponds to a plurality of resource element groups (REGs). The REG includes a plurality of resource elements (REs). According to the relationship between the number of CCEs and the coding rate provided by the CCEs, a PDCCH format and a possible PDCCH bit number are determined.

A BS determines the number of CCEs used in transmission of the PDCCH according to a channel state. For example, a UE having a good DL channel state may use one CCE in PDCCH transmission. A UE having a poor DL channel state may use 8 CCEs in PDCCH transmission.

One REG (indicated by a quadruplet in the drawing) includes 4 REs. One CCE includes 9 REGs. The number of CCEs used to configure one PDCCH may be selected from {1, 2, 4, 8}. Each element of {1, 2, 4, 8} is referred to as a CCE aggregation level.

A control channel consisting of one or more CCEs performs interleaving in unit of REG, and is mapped to a physical resource after performing cyclic shift based on a cell identifier (ID).

Figure 7:
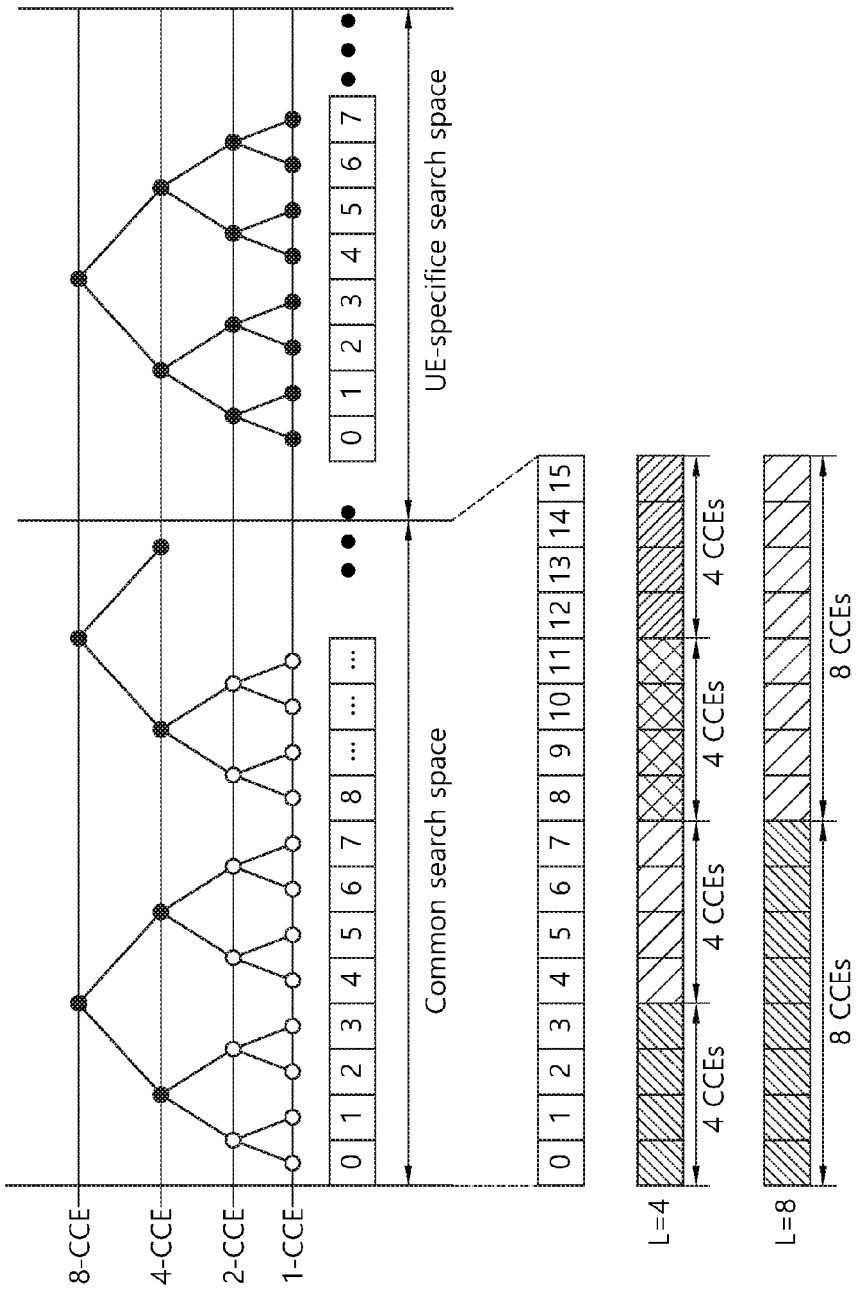
FIG. 7 illustrates an example of monitoring of a PDCCH.

FIG. 7 illustrates an example of monitoring of a PDCCH.

A UE cannot know about a specific position in a control region in which its PDCCH is transmitted and about a specific CCE aggregation or DCI format used for transmission. A plurality of PDCCHs can be transmitted in one subframe, and thus the UE monitors the plurality of PDCCHs in every subframe. Herein, monitoring is an operation of attempting PDCCH decoding by the UE according to a PDCCH format.

The 3GPP LTE uses a search space to reduce an overhead of blind decoding. The search space can also be called a monitoring set of a CCE for the PDCCH. The UE monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 2 below shows the number of PDCCH candidates monitored by a wireless device.

TABLE 2

| Type | Search space $S^{(L)}_k$ | | Number $M^{(L)}$ of PDCCH candidates |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A size of the search space is determined by Table 2 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level $L \in \{1,2,3,4\}$, a search space $S(L)k$ is defined as a set of PDCCH candidates. A CCE corresponding to a PDCCH candidate m of the search space $S(L)k$ is given by Equation 1 below.

$$L\{(Y_k+m') \bmod \lfloor N_{CCE,k}/L \rfloor\}+i \quad \text{[Equation 2]}$$

Herein, $i=0, 1, \ldots, L-1, m=0, \ldots, M(L)-1$, and NCCE,k denotes the total number of CCEs that can be used for PDCCH transmission in a control region of a subframe k. The control region includes a set of CCEs numbered from 0 to NCCE,k−1. M(L) denotes the number of PDCCH candidates in a CCE aggregation level L of a given search space.

If a carrier indicator field (CIF) is configured for the wireless device, m'=m+M(L)ncif. Herein, ncif is a value of the CIF. If the CIF is not configured for the wireless device, m'=m.

In a common search space, Yk is set to 0 with respect to two aggregation levels L=4 and L=8.

In a UE-specific search space of the aggregation level L, a variable Yk is defined by Equation 2 below.

$$Y_k(A*Y_{k-1}) \bmod D \quad \text{[Equation 3]}$$

Herein, Y−1=nRNTI≠0, A=39827, D=65537, k=floor(ns/2), and ns denotes a slot number in a radio frame.

When the UE monitors the PDCCH by using the C-RNTI, a search space and a DCI format used in monitoring are determined according to a transmission mode of the PDSCH.

Meanwhile, when the UE monitors the PDCCH by using the C-RNTI, a search space and a DCI format used in monitoring are determined according to a transmission mode (TM) of the PDSCH. Table 3 below shows an example of PDCCH monitoring for which the C-RNTI is configured.

TABLE 3

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD(Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN sub-frame: if the number of PBCH antenna ports is 1, port 0 is used as independent antenna |

TABLE 3-continued

| Transmission mode | DCI format | Search space | Transmission mode of PDSCH according to PDCCH |
|---|---|---|---|
| | DCI format 2D | Terminal specific | port. Otherwise, transmit Diversity MBSFN sub-frame: port 7 as independent antenna port 8 transmisison layers, ports 7-14 are used or port 7 or 8 is used as independent antenna port |

The usage of the DCI format is classified as shown in Table 3 below.

TABLE 4

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

Figure 8:
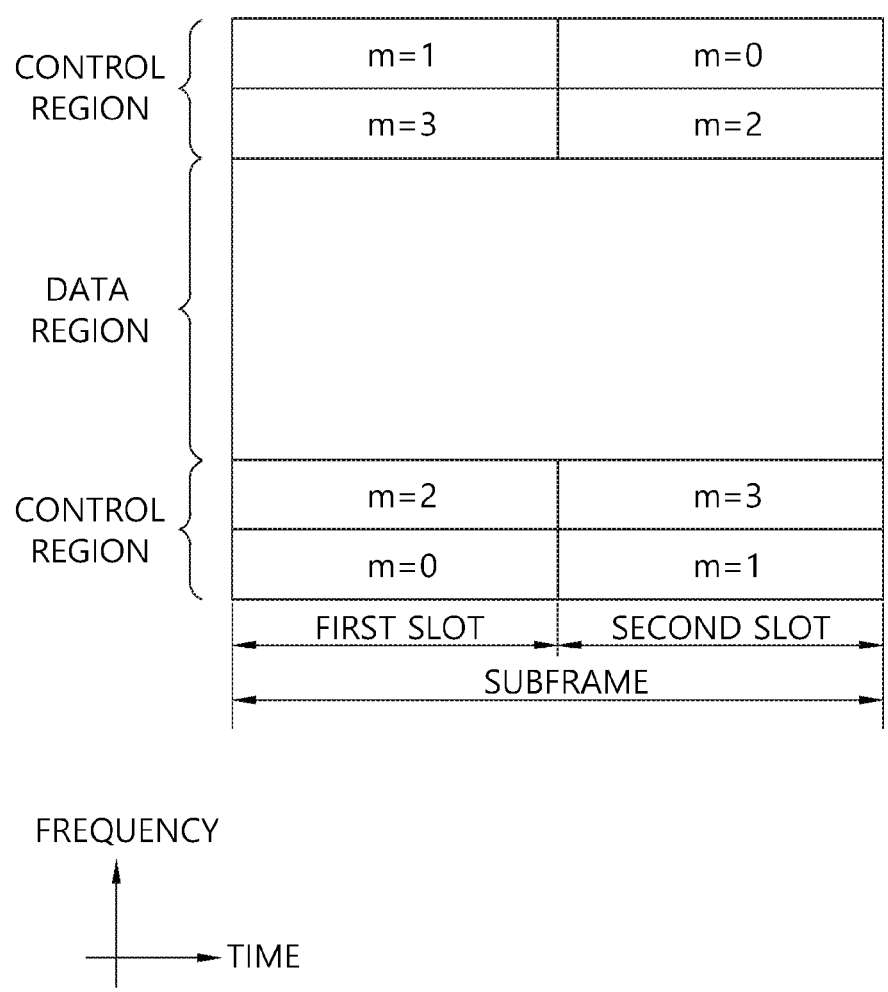
FIG. 8 illustrates the architecture of a UL sub-frame in 3GPP LTE.

FIG. 8 illustrates the architecture of a UL sub-frame in 3GPP LTE.

Referring to FIG. 8, the uplink sub-frame may be separated into a control region and a data region in the frequency domain. The control region is allocated a PUCCH (physical uplink control channel) for transmission of uplink control information. The data region is allocated a PUSCH (physical uplink shared channel) for transmission of data (in some cases, control information may also be transmitted).

The PUCCH for one user equipment is allocated in resource block (RB) pair in the sub-frame. The resource blocks in the resource block pair take up different sub-carriers in each of the first and second slots. The frequency occupied by the resource blocks in the resource block pair allocated to the PUCCH is varied with respect to a slot boundary. This is referred to as the RB pair allocated to the PUCCH having been frequency-hopped at the slot boundary. A frequency diversity gain may be obtained by transmitting uplink control information through different sub-carriers over time.

Since the UE transmits UL control information over time through different subcarriers, a frequency diversity gain can be obtained. In the figure, m is a location index indicating a logical frequency-domain location of the RB pair allocated to the PUCCH in the sub-frame.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 9:
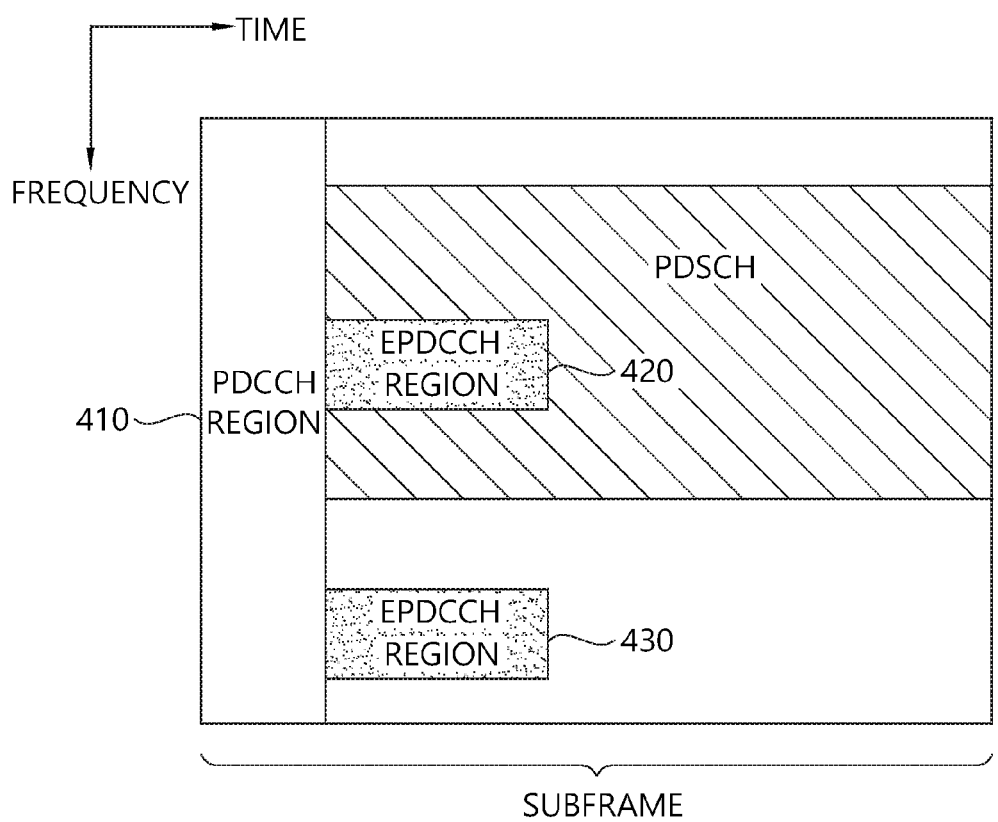
FIG. 9 illustrates a subframe having an EPDCCH.

FIG. 9 illustrates a subframe having an EPDCCH.

A subframe may include a zero or one PDCCH region 410 or zero or more EPDCCH regions 420 and 430.

The EPDCCH regions 420 and 430 are regions in which a wireless device monitors an EPDCCH. The PDCCH region 410 is located in up to four front OFDM symbols of a subframe, while the EPDCCH regions 420 and 430 may flexibly be scheduled in OFDM symbols after the PDCCH region 410.

One or more EPDCCH regions 420 and 430 may be designated for the wireless device, and the wireless devices may monitor an EPDCCH in the designated EPDCCH regions 420 and 430.

The number/location/size of the EPDCCH regions 420 and 430 and/or information on a subframe for monitoring an EPDCCH may be provided by a base station to a wireless device through an RRC message or the like.

In the PDCCH region 410, a PDCCH may be demodulated based on a CRS. In the EPDCCH regions 420 and 430, a demodulation (DM) RS may be defined, instead of a CRS, for demodulation of an EPDCCH. An associated DM RS may be transmitted in the corresponding EPDCCH regions 420 and 430.

An RS sequence rns(m) for the associated DM RS is represented by Equation 3.

$$r_{l,ns}(m) = \frac{1}{\sqrt{2}}(1 - 2 \cdot c(2m)) + j\frac{1}{\sqrt{2}}(1 - 2 \cdot c(2m+1))$$ [Equation 4]

Here, m=0, 1, ..., 2NmaxRB−1, NmaxRB denotes the maximum number of RBs, ns denotes the number of a slot in a radio frame, and l denotes the number of an OFDM symbol in a slot.

A pseudo-random sequence c(i) is defined by the following gold sequence with a length of 31.

Here, m=0, 1, ..., 12NRB−1, and NRB denotes the maximum number of RBs. A pseudo-random sequence generator may be initialized as cinit=(floor(ns/2)+1)(2NEPDCCH,ID+1)216+nEPDCCH,SCID in each starting subframe. ns is the number of a slot in a radio frame, NEPDCCH,ID is a value associated with an EPDCCH set, which is given through a higher-layer signal, and nEPDCCH,SCID is a specific value.

The EPDCCH regions 420 and 430 may be used for scheduling for different cells, respectively. For example, an EPDCCH in the EPDCCH region 420 may carry scheduling information for a primary cell, and an EPDCCH in the EPDCCH region 430 may carry scheduling information for a secondary cell.

When EPDCCHs are transmitted in the EPDCCH regions 420 and 430 through multiple antennas, the same precoding as for the EPDCCHs may be applied to DM RSs in the EPDCCH regions 420 and 430.

Comparing with a CCE used as a transmission resource unit for a PDCCH, a transmission resource unit for an EPDCCH is an enhanced control channel element (ECCE). An aggregation level may be defined as a resource unit for monitoring an EPDCCH. For example, defining one ECCE as a minimum resource for an EPDCCH, an aggregation level may be defined as L={1, 2, 4, 8, 16}.

Hereinafter, an EPDCCH search space may correspond to an EPDCCH region. In an EPDCCH search space, one or more EPDCCH candidates may be monitored by one or more aggregation levels.

Hereinafter, resource allocation for an EPDCCH will be described.

An EPDCCH is transmitted using one or more ECCEs. An ECCE includes a plurality of enhanced resource element groups (EREGs). An ECCE may include four EREGs or eight EREGs according to a subframe type based on a TDD DL-UL configuration and a CP. For example, an ECCE may include four EREGs in a normal CP, while an ECCE may include eight EREGs in an extended CP.

A physical resource block (PRB) pair refers to two PRBs having the same RB number in one subframe. A PRB pair refers to a first PRB of a first slot and a second PRB of a second slot in the same frequency domain. In a normal CP, a PRB pair includes 12 subcarriers and 14 OFDM symbols and thus includes 168 REs.

Figure 10:
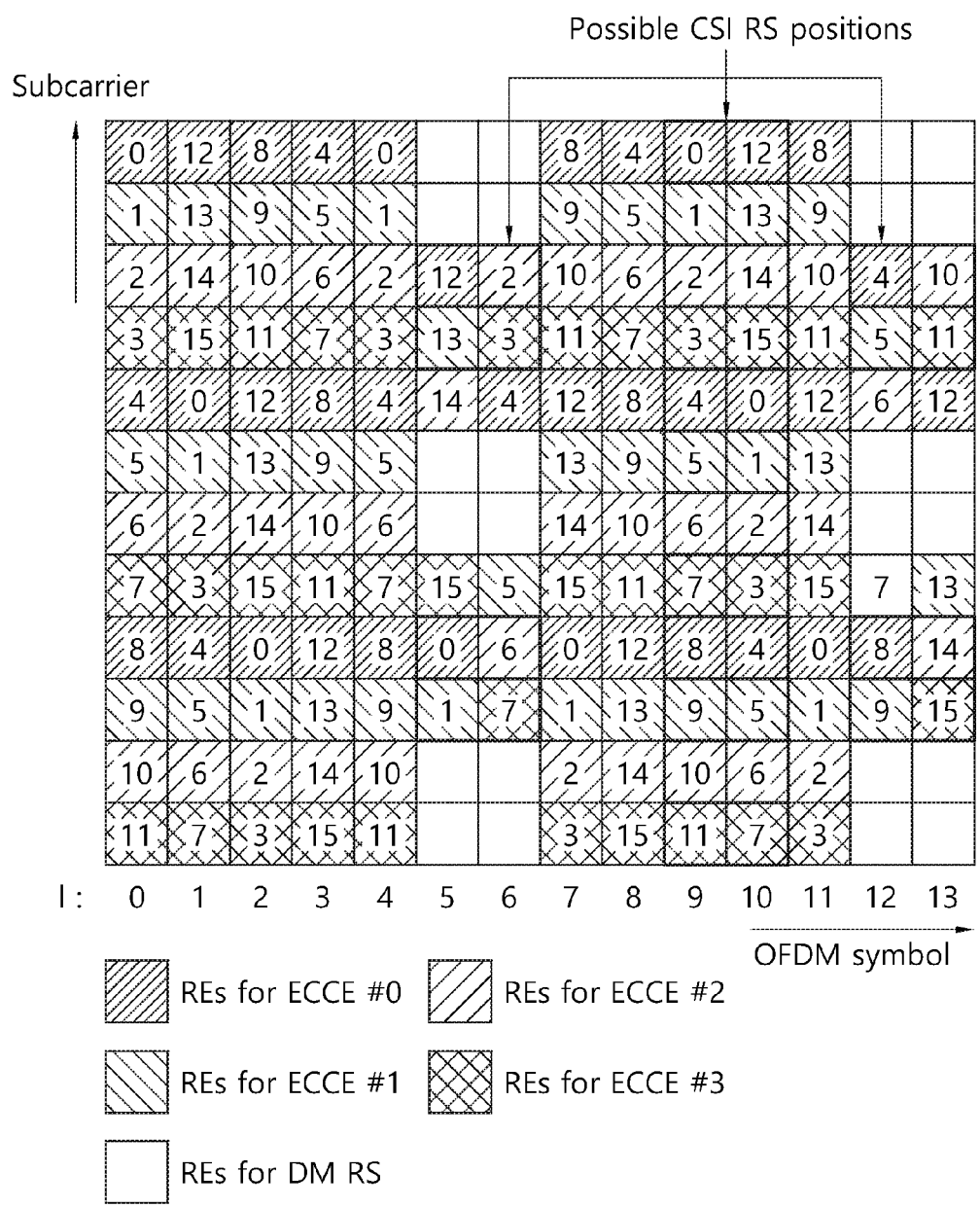
FIG. 10 illustrates an example of a PRB pair.

FIG. 10 illustrates an example of a PRB pair.

Although it is shown below that a subframe includes two slots and a PRB pair in one slot includes seven OFDM symbols and 12 subcarriers, these numbers of OFDM symbols and subcarriers are provided for illustrative purposes only.

In one subframe, a PRB pair includes 168 REs. 16 EREGs are formed from 144 Res, excluding 24 REs for a DM RS. Thus, one EREG may include nine REs. Here, a CSI-RS or CRS may be disposed in one PRB pair in addition the DM RM. In this case, the number of available REs may be reduced and the number of REs included in one EREG may be reduced. The number of REs included in an EREG may change, while the number of EREGs included in one PRB pair, 16, does not change.

Here, as illustrated in FIG. 10, REs may sequentially be assigned indexes, starting from a top subcarrier in a leftmost OFDM symbol (l=0) (or REs may sequentially be assigned indexes in an upward direction, starting from a bottom subcarrier in the leftmost OFDM symbol (l=0)). Suppose that 16 EREGs are assigned indexes from 0 to 15. Here, nine REs having RE index 0 are allocated to EREG 0. Likewise, nine REs having RE index k (k=0, ..., 15) are allocated to EREG k.

A plurality of EREGs is combined to define an EREG group. For example, an EREG group including four EREGs may be defined as follows: EREG group #0={EREG 0, EREG 4, EREG 8, EREG 12}, EREG group #1={EREG 1, EREG 5, EREG 9, EREG 3}, EREG group #2={EREG 2, EREG 6, EREG 10, EREG 14}, and EREG group #3={EREG 3, EREG 7, EREG 11, EREG 15}. An EREG group including eight EREGs may be defined as follows: EREG group #0={EREG 0, EREG 2, EREG 4, EREG 6, EREG 8, EREG 10, EREG 12, EREG 14} and EREG group #1={EREG 1, EREG 3, EREG 5, EREG 7, EREG 9, EREG 11, EREG 13, EREG 15}.

As described above, an ECCE may include four EREGs, and an ECCE may include eight EREGs in an extended CP. An ECCE is defined by an ERGE group. For example, FIG. 6 shows that ECCE #0 includes EREG group #0, ECCE #1 includes EREG group #1, ECCE #2 includes EREG group #2, and ECCE #3 includes EREG group #3.

There are localized transmission and distributed transmission in ECCE-to-EREG mapping. In localized transmission, an EREG group forming one ECCE is selected from EREGs in one PRB pair. In distributed transmission, an EREG group forming one ECCE is selected from EREGs in different PRB pairs.

Figure 11:
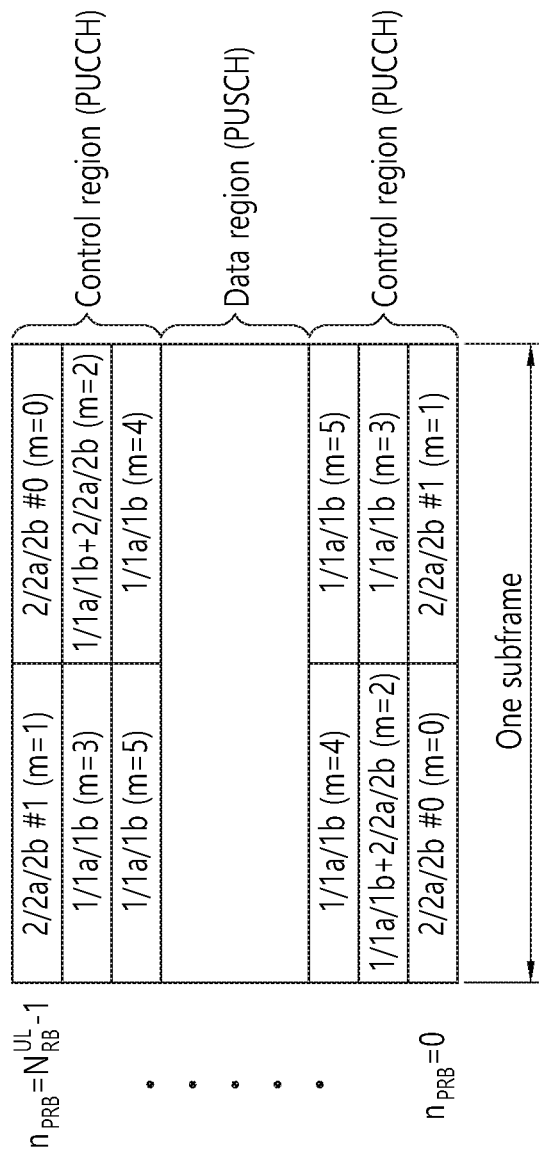
FIG. 11 illustrates a PUCCH and a PUSCH on an uplink subframe.

FIG. 11 illustrates a PUCCH and a PUSCH on an uplink subframe.

PUCCH formats will be described with reference to FIG. 10.

Uplink control information (UCI) may be transmitted to the PUCCH. In this case, the PUCCH transmits various types of control information according to a format. The UCI includes a HARQ ACK/NACK, a scheduling request (SR), and channel status information (CSI) representing a downlink channel status.

PUCCH format 1 transmits a scheduling request (SR). In this case, an on-off keying (OOK) scheme may be applied. PUCCH format 1a transmits an acknowledgement/non-acknowledgment (ACK/NACK) modulated by a binary phase shift keying (BPS K) scheme with respect to one codeword. PUCCH format 1b transmits an ACK/NACK modulated by a quadrature phase shift keying (QPSK) scheme with respect to two codewords. PUCCH format 2 transmits a channel quality indicator (CQI) modulated by the QPSK scheme. PUCCH formats 2a and 2b transport the CQI and the ACK/NACK.

Table 5 illustrates the PUCCH formats.

TABLE 5

| Format | Description |
| --- | --- |
| Format 1 | Scheduling request (SR) |
| Format 1a | ACK/NACK of 1 bit HARQ, Scheduling request (SR) may exist or not |
| Format 1b | ACK/NACK of 2 bit HARQ, Scheduling request (SR) may exist or not |
| Format 2 | CSI (20 code bits) |
| Format 2 | In the case of extended CP, CSI and HARQ ACK/NACK of 1 bit or 2 bits |
| Format 2a | CSI and HARQ ACK/NACK of 1 bit |
| Format 2b | CSI and HARQ ACK/NACK of 2 bits |
| Format 3 | A plurality of ACK/NACKs for carrier aggregation |

Each PUCCH format is mapped in the PUCCH to be transmitted. For example, the PUCCH formats 2/2a/2b are mapped in the resource block (m=0, 1 in FIG. 7) of a band edge allocated to the UE to be transmitted. A mixed PUCCH resource block (RB) may be mapped in a resource block (for example, m=2) adjacent to the resource block to which the PUCCH formats 2/2a/2b are allocated in a central direction of the band to be transmitted. The PUCCH formats 1/1a/1b to which the SR and the ACK/NACK are transmitted may be disposed in a resource block of m=4 or m=5. The number N(2)RB of resource blocks which may be used in the PUCCH formats 2/2a/2b to which the CQI is transmitted may be indicated to the UE through a broadcasted signal.

The aforementioned CSI is an index representing a status of the DL channel, and may include at least one of a channel quality indicator (CQI) and a precoding matrix indicator (PMI). Further, a precoding type indicator (PTI), a rank indication (RI), and the like may be included.

The CQI provides information on link adaptive parameters which may be supported by the UE for a predetermined time. The CQI may indicate a data rate which may be supported by the DL channel by considering a characteristic of the UE receiver, a signal to interference plus noise ratio (SINR), and the like. The base station may determine modulation (QPSK, 16-QAM, 64-QAM, and the like) to be applied to the DL channel and a coding rate by using the CQI. The CQI may be generated by various methods. For example, the various methods include a method of quantizing and feed-backing the channel status as it is, a method of calculating and feed-backing a signal to interference plus noise ratio (SINR), a method of notifying a status which is actually applied to the channel such as a modulation coding scheme (MCS), and the like. When the CQI is generated based on the MCS, the MCS includes a modulation scheme, a coding scheme, and a coding rate according to the coding scheme, and the like.

The PMI provides information on a precoding matrix in precoding based on a code book. The PMI is associated with the multiple input multiple output (MIMO). The feedbacking of the PMI in the MIMO may be called a closed loop MIMO.

The RI is information on the number of layers recommended by the UE. That is, the RI represents the number of independent streams used in spatial multiplexing. The RI is fed-back only in the case where the UE operates in an MIMO mode using the spatial multiplexing. The RI is always associated with one or more CQI feed-backs. That is, the fed-back CQI is calculated by assuming a predetermined RI value. Since the rank of the channel is generally changed slower than the CQI, the RI is fed-back less than the number of CQIs. A transmission period of the RI may be a multiple of the CQI/PMI transmission period. The RI is defined in the entire system band, and a frequency-selective RI feedback is not supported.

As such, the PUCCH is used only in the transmission of the UCI. To this end, the PUCCH support multiple formats. A PUCCH having different bit numbers for each subframe may be used according to a modulation scheme subordinate to the PUCCH format.

Meanwhile, the illustrated PUSCH is mapped in an uplink shared channel (UL-SCH) which is a transmission channel Uplink data transmitted on the PUSCH may be a transmission block which is a data block for the UL-SCH transmitted during the TTI. The transmission block may include user data. Alternatively, the uplink data may be multiplexed data. The multiplexed data may be acquired by multiplexing the transmission block for the UL-SCH and the channel status information. For example, the channel status information (CSI) multiplexed in the data may include the CQI, the PMI, the RI, and the like. Alternatively, the uplink data may be constituted by only the uplink status information. Periodic or aperiodic channel status information may be transmitted through the PUSCH.

The PUSCH is allocated by the UL grant on the PDCCH. Although not illustrated, a fourth OFDM symbol of each slot of the normal CP is used in the transmission of a demodulation reference signal (DM RS) for the PUSCH.

A carrier aggregation system is now described.

FIG. 12 illustrates an example of comparison between a single carrier system and a carrier aggregation system.

Referring to FIG. 12, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5

MHz CC(carrier #0)+20 MHz CC(carrier #1)+20 MHz CC(carrier #2)+20 MHz CC(carrier #3)+5 MHz CC(carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 13:
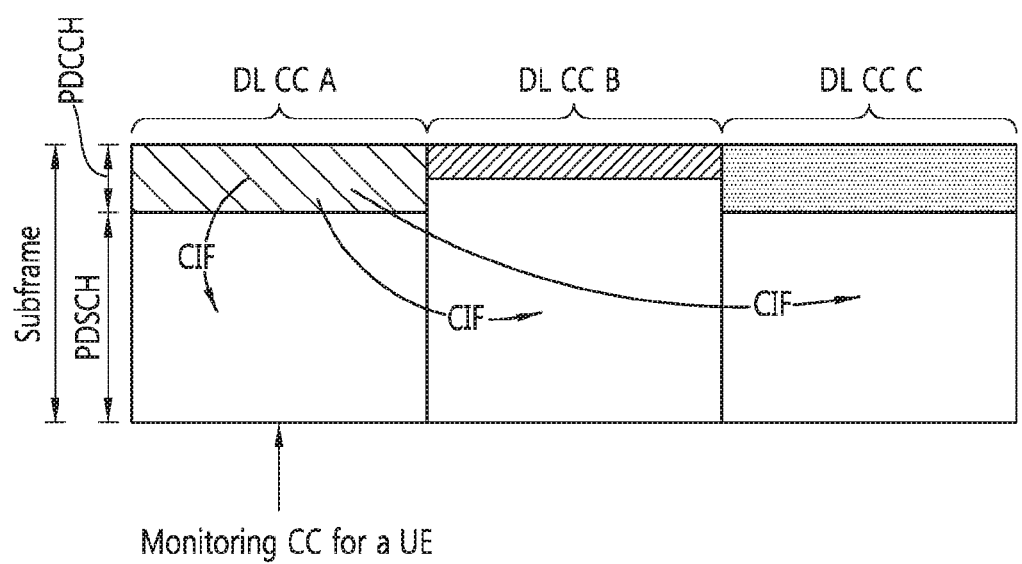
FIG. 13 exemplifies cross-carrier scheduling in the carrier aggregation system.

FIG. 13 exemplifies cross-carrier scheduling in the carrier aggregation system.

Referring to FIG. 13, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 13 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 14:
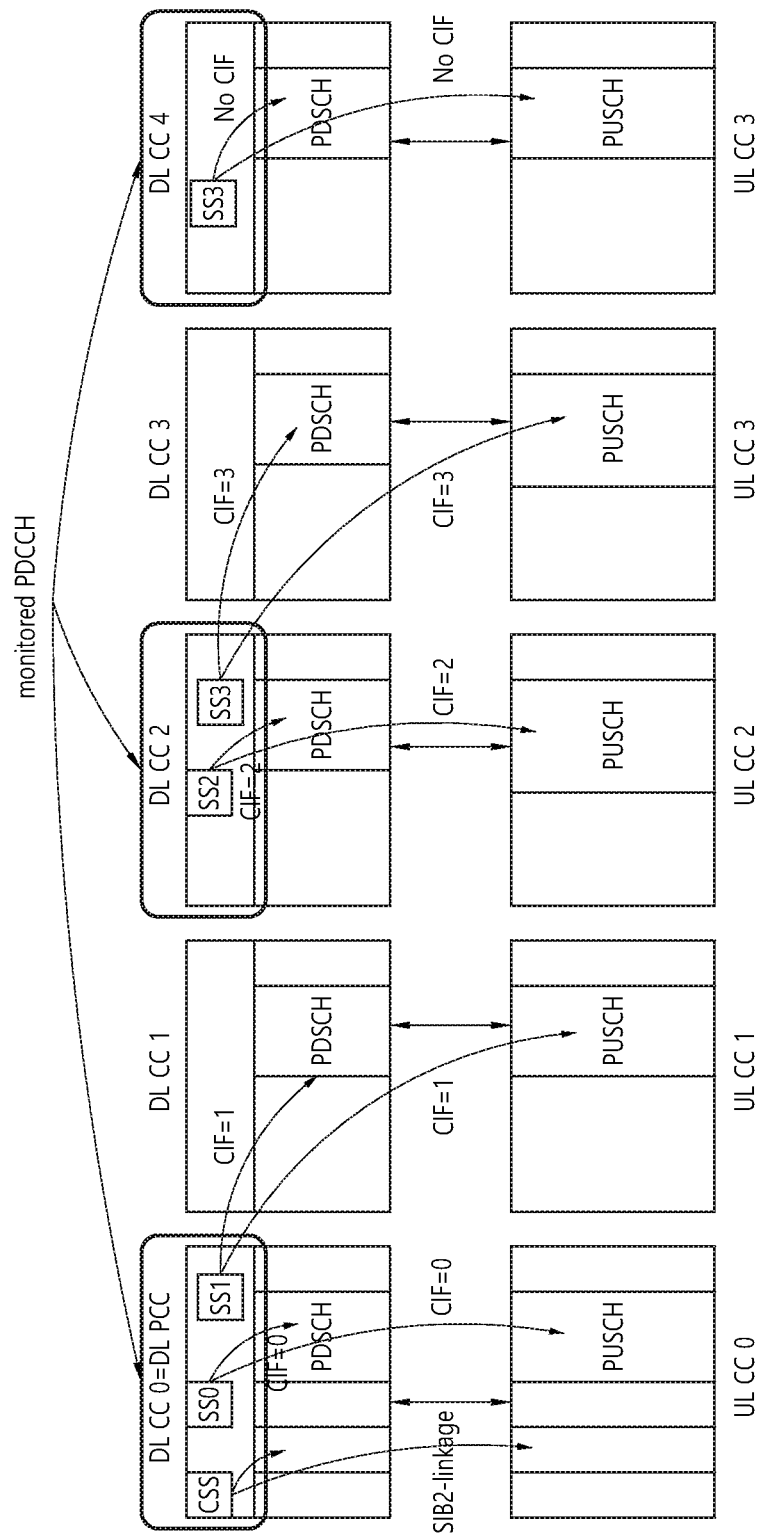
FIG. 14 illustrates an example of scheduling performed when cross-carrier scheduling is configured in a cross-carrier scheduling.

FIG. 14 illustrates an example of scheduling performed when cross-carrier scheduling is configured in a cross-carrier scheduling.

Referring to FIG. 14, DL CC 0, DL CC 2, and DL CC 4 belong to a PDCCH monitoring DL CC set. The user equipment searches for DL grants/UL grants for DL CC 0 and UL CC 0 (UL CC linked to DL CC 0 via SIB 2) in the CSS of DL CC 0. The user equipment searches for DL grants/UL grants for DL CC 1 and UL CC 1 in SS 1 of DL CC 0. SS 1 is an example of USS. That is, SS 1 of DL CC 0 is a space for searching for a DL grant/UL grant performing cross-carrier scheduling.

Hereinafter, a small cell environment (alternatively, a small cell cluster environment) will be described.

<Small Cell Cluster Environment>

Meanwhile, in the existing LTE-A system, when a plurality of component carriers (CCs) are aggregated and used, data transmission and acquisition of a cell identifier (cell ID), transmission of system information, and transmission of a physical control signal are enabled, and as a result, a primary CC (PCC, Pcell) which is able to transmit and receive a control signal and data by access as an independent CC is present and a secondary CC (SCC, Scell) which is able to transmit and receive data only when aggregated together with the PCC may be configured.

In the existing LTE-A system, a scheme of transmitting an ACK/NACK for the plurality of downlink (DL) data transmitted through the plurality of CCs through only the PPC is used.

In the next-generation system of LTE-A, an environment constructing a plurality of small cells or small-scaled cells or an environment of combining a plurality of small cells and macro cells is considered. In this case, the small cell may be used as a Pcell of specific UE or the corresponding small cell may be used as only a Scell.

That is, the environment of combining the plurality of small cells and macro cells may mean an environment including the plurality of small-scaled cells grouped by a cluster unit.

In detail, in order to cope with an increase in mobile traffic such as hotspot disposed indoor and outdoor, small cells using low power nodes are considered.

Herein, the low power node may generally mean a macro node and a node having transmission power (Tx power) lower than base station (BS) classes.

Improvements of the small cell for E-UTRA and E-UTRAN focus on additional functions for ensuring improved performance in hotspot areas indoor and outdoor using low power nodes.

A mechanism for ensuring an efficient small cell operation includes the following details.

Introduction of small cell on/off mechanisms for interference avoidance and interference coordination between small cells adapting to changing traffic Herein, mechanisms waking on or off the cells, and required measurement and process need to be specified.

Searching signal (alternatively, discovery signal) of DL/UL or physical signals helping in adaptation Improved processes which reduce transition of flexible time scales Improved processes, measurements, and network load/utilization metrics for coordinated network decision Note: when one or more component carriers are present, the small cell may refer to one or more component carriers.

Introduction of discovery processes for UEs for finding an appropriate number of small cells operating a single or multiple carriers with one short time period, by considering small cell on/off mechanisms.

Introduction of mechanisms for inter-cell synchronization (for example, listening and UE assisted synchronization)-based radio interface for achieving synchronization between small cell and overlaid macro cell, synchronization between small cells in the same small cell group or small cell cluster, and synchronization between small cell clusters.

Figure 15A:
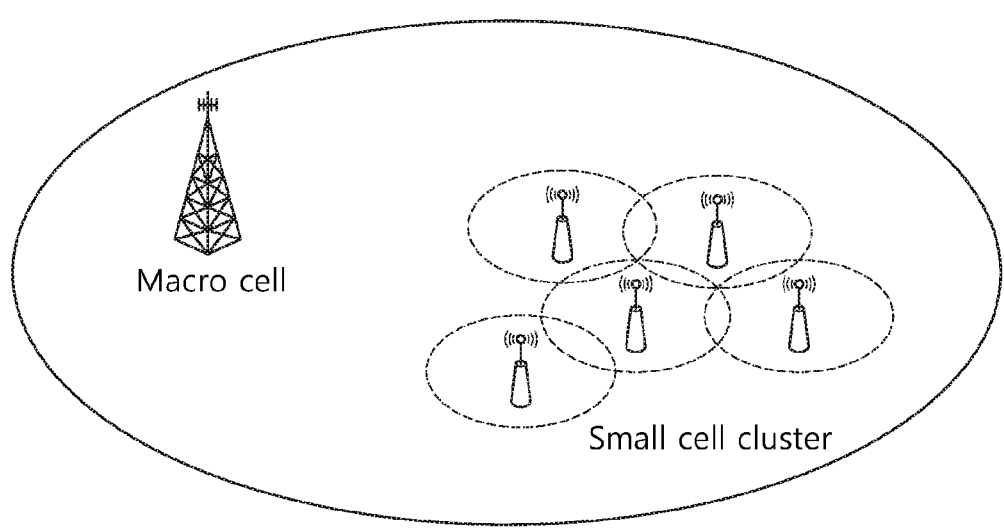
FIGS. 15A and 15B illustrate an example of a small cell cluster environment including a plurality of small cells.
Figure 15B:
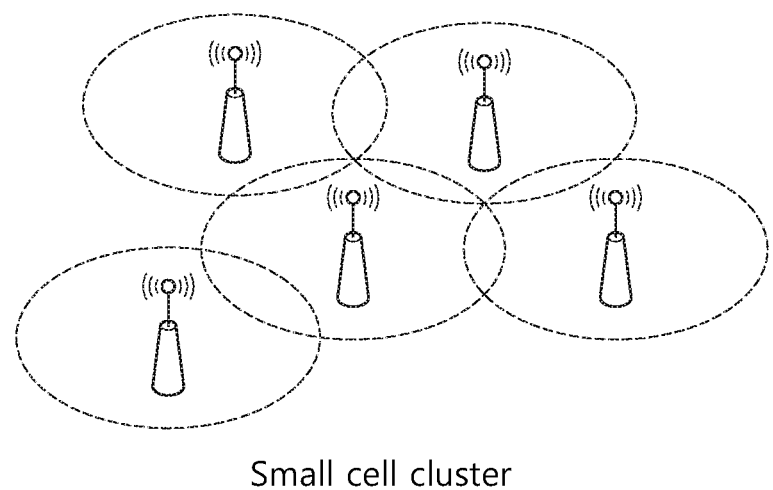

FIGS. 15A and 15B illustrate an example of a small cell cluster environment including a plurality of small cells.

Referring to FIGS. 15A and 15B, a plurality of small cells may be present in a small cell group or a small cell cluster.

The small cell cluster may be present in a macro cell coverage as illustrated in FIG. 15A and independently present out of the macro cell coverage as illustrated in FIG. 15B. In this case, the small cells in the same cluster all may operate with the same carrier frequency.

<Downlink Power Allocation>

Meanwhile, hereinafter, downlink power allocation will be described with reference to Section 5.2 of 3GPP TS 36.213 V8.7.0 (2009-05).

The base station determines an energy per resource element (EPRE) per resource element (RE).

A wireless device may determine a reference signal (RS) EPRE based on RS transmission power given by the BS. In each OFDM symbol, a ratio of PDSCH EPRE to RS EPRE is represented by ρA or ρB. The ρA and ρB are specified in the wireless device. The ρA or ρB is determined according to whether a CRS is included in the corresponding OFDM symbol. In 3GPP LTE, the ρA or ρB is determined as follows.

TABLE 6

| The number of antenna ports | OFDM symbol index in slot used by $\rho_A$ | | OFDM symbol index in slot used by $\rho_B$ | |
|---|---|---|---|---|
| | Normal CP | Extended CP | Normal CP | Extended CP |
| 1 or 2 | 1, 2, 3, 5, 6 | 1, 2, 4, 5 | 0, 4 | 0, 3 |
| 4 | 2, 3, 5, 6 | 2, 4, 5 | 0, 1, 4 | 0, 1, 3 |

ρA may be calculated as ρA=δpoweroffset+PA+10 log 10(2)[dB] when the UE or the terminal receives PDSCH data transmission using precoding for transmission diversity of four cell-specific antenna ports according to section 6.3.4.3 of 3GPP TS 36.211, and ρA=δpoweroffset+PA[dB] in the remaining case. δpoweroffset is a specific value and PA is a value given by the BS.

ρA is equal to ρA=δpoweroffset+PA+10 log 10(2)[dB] when the UE receives a PDSCH data transmission using precoding for transmit diversity with 4 cell-specific antenna ports according to Section 6.3.4.3 of 3GPP TS 36.211

ρA is equal to ρA=δpoweroffset+PA[dB] otherwise

ρB/ρA is determined by a parameter PB given by the BS as follows.

TABLE 7

| | $\rho_B/\rho_A$ | |
|---|---|---|
| $P_B$ | 1 antenna port | 2 or 4 antenna ports |
| 0 | 1 | 5/4 |
| 1 | 4/5 | 1 |
| 2 | 3/5 | 3/4 |
| 3 | 2/5 | 1/2 |

That is, in 3GPP LTE, ρA or ρB is determined according to an OFDM symbol index in a slot. ρA is determined based on the parameter PB given by the BS. ρB is determined based on the parameter PB after determining ρA according to Table 7.

An existing 3GPP LTE/LTE-A-based radio communication system transmits a reference signal, a synchronization signal, a control channel, and the like through a DL carrier. A DL carrier based on the 3GPP LTE/LTE-A is called a legacy carrier.

However, in the next-generation radio communication system, in order to reduce interference between a plurality of serving cells and improve extension of the carrier, a new carrier is introduced. The carrier is called an extension carrier or a new carrier type (NCT). A cell based on the extension carrier is called an extended cell.

In the legacy carrier, the CRS is transmitted from all DL subframes through the entire system band. In comparison with this, in the NCT, the CRS is not transmitted or transmitted from a specific DL subframe through some of the system bands. Accordingly, the CRS is not used in demodulation, but may be used only in synchronization tracking, and in this aspect, the CRS may be called a tracking RS (TRS).

In the legacy carrier, a PDCCH is demodulated based on the CRS, but in the NCT, the PDCCH may not be transmitted. In the legacy carrier, the CRS is used in data demodulation, but in the NCT, only a URS (and/or a UE-specific RS) is used in the data demodulation.

The legacy carrier may be set by the primary cell or the secondary cell, but the extension cell may be set by only the secondary cell.

As described above, in the legacy carrier, the CRS is transmitted through the entire bands in all subframes, and the transmission power for the CRS may be calculated based on a given value (called an RS power parameter) in the BS. In addition, as illustrated in Table 1, in the EPRE for the PDSCH in an existing system, the ratio of PDSCH EPRE to RS EPRE may vary according to the presence of the CRS in the OFDM symbol, in order to correct the entire transmission power capable of being changed according to the CRS.

Hereinafter, the RS EPRE may include an EPRE obtained based on the CRS or an EPRE obtained based on the TRS. The PDSCH EPRE may include an EPRE used in the traffic data transmission.

Hereinafter, the ratio of PDSCH EPRE to RS EPRE may be marked as a power ratio (PR). In the PR, a uniform value may be applied to all of the REs in the same OFDM symbol. The PR for the OFDM symbol without the CRS is represented by ρA and the PR for the OFDM symbol with the CRS may be represented by ρB.

The reason for dividing the PRs according to the presence of the CRS is as follows. The reason is that since the CRS is a reference used in channel estimation, the RS RE needs to be transmitted with higher power than the PDSCH RE used in the traffic data transmission. Due to high transmission power allocation in the CRS RE, in the PDSCH RE in the OFDM symbol with the CRS, lower transmission power than the PDSCH RE in the OFDM symbol without the CRS may be set. The wireless device may perform demodulation by applying a suitable amplitude based on the RS transmission power for the modulation symbol to which 16-QAM or 64-QAM is applied.

<Disclosure of Present Specification—Power Back-Off Scheme for High Order Modulation Scheme>

As described above, in a next-generation system, a situation may be considered, in which a channel situation for a terminal is improved further than the existing environment under a small cell environment. In this case, a high order modulation scheme such as 256 QAM may be introduced.

However, the performance of a wireless communication system using the high order modulation scheme may deteriorate even with respect to the same error vector magnitude (EVM).

Therefore, an object of the disclosure of the present specification is to present a scheme that solves the problem.

In the disclosure of the present specification, in order to secure the EVM at a degree to be acceptable in a system that supports transmission by the high order modulation scheme such as 256 QAM, a method for setting power of a transmitter and an associated signaling technique are proposed.

In detail, as a method for solving the problem, maintaining the EVM low may be considered. However, in general, setting corresponding EVM requirements low may limit hardware implementation and increase implementation cost.

As another method, decreasing a range of power which operates in a transmitter may be reduced in order to reduce an error due to non-linearity of a power amplifier. Hereinafter, reducing the range of the power of the transmitter will be referred to as power back-off.

As one example, when maximum transmission power is decreased to 21 [dBm] in a system or hardware in which the EVM is 8% at 24 [dBm], an effect to decrease a substantial EVM value to 4% may be anticipated.

In particular, the disclosure of the present specification proposes an efficient power back-off scheme in a system using the high order modulation scheme.

Hereinafter, for easy description, the transmitting end is limited as the base station (eNodeB) and the receiving end is limited as the user equipment (UE) or the terminal and it is described that the high order modulation scheme is 256 QAM, but contrary to this, the disclosure of the present specification may be applied even to other modulation schemes.

Figure 16:
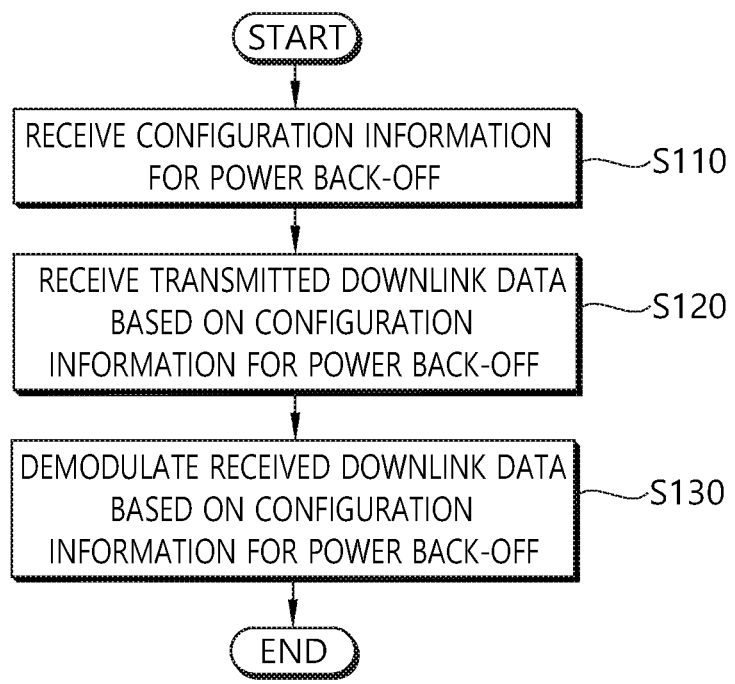
FIG. 16 is a flowchart of a method for receiving downlink data depending on back-off according to a disclosure of the present specification.

FIG. 16 is a flowchart of a method for receiving downlink data depending on back-off according to a disclosure of the present specification.

Referring to FIG. 16, the method according to disclosure of the present specification as a method for receiving the downlink data in the wireless communication system supporting 256 QAM may be constituted by steps descried below.

First, the terminal may receive configuration information for power back-off (S110).

Next, the terminal may receive the downlink data transmitted based on the configuration information for the power back-off (S120).

Next, the terminal may demodulate and/or decode the downlink data received based on the configuration information for the power back-off (S130).

Herein, the configuration information for the power back-off may be information associated with at least one of whether to apply the power back-off, a power reduction amount of the downlink by the power back-off, a frame index to which the power back-off is applied, a subframe index, and a resource to which the power back-off is applied.

When a case in which the power back-off is applied, first, at least one terminal among a plurality of terminals which communicates with a serving cell is configured to use the 256 QAM, the power back-off may be applied.

Further, when the downlink data is downlink data transmitted to the terminal configured to use the 256 QAM among the plurality of terminals which communicates with the serving cell.

In addition, when the downlink data is downlink data transmitted to the terminal which operates in the 256 QAM among the plurality of terminals which communicates with the serving cell, the power back-off may be applied.

The configuration information for the power back-off may be signaled by a high layer.

Further, the resource to which the power back-off is applied may be a resource acquired by excluding a resource corresponding to a downlink control channel from resources corresponding to the downlink data.

Herein, the downlink control channel may be at least one of a Physical Control Format Indicator Channel (PCFICH), a Physical Hybrid-ARQ Indicator Channel (PHICH), a Physical Downlink Control Channel (PDCCH), and an enhanced PDCCH (EPDCCH).

Further, the resource to which the power back-off is applied may be a resource acquired by excluding a resource corresponding to a cell-specific signal from the resources corresponding to the downlink data.

Herein, the cell-specific signal may be at least one of a Primary Synchronization Signal (PSS), a Secondary Synchronization Signal (SSS), a Cell-specific Reference Signal (CRS), and a Positioning Reference Signal (PRS).

Hereinafter, disclosures of the present specification will be described in detail.

An effective signal-to-noise-plus-interference ratio (SINR) at the receiving end may depend on the channel environment and the EVM value depending on the hardware implementation.

Equation 5 given below is one example of configuring of the effective SINR.

$$SINR_{\textit{eff}} = 10\log 10\left(\frac{10^{SINR/10}}{1 + EVM^2 \times 10^{SINR/10}}\right) \quad \text{[Equation 5]}$$

Herein, the EVM may be interpreted as a value in a case of considering the transmitting end Tx or the receiving end Rx or both the transmitting end and the receiving end. Further, all SINR values are dB scale.

As described above, when the power back-off is used, the value of the EVM may be decreased and SINR reduction by the EVM may be alleviated.

However, the effective SINR may be decreased as the power of the transmitting end decreases due to the power back-off. In the case of the 256 QAM, an interval in which the operation is available and the use is efficient is anticipated as a high SINR region and in this case, the power back-off is introduced to anticipate an increase of the effective SINR.

According to the disclosure of the present specification, the power back-off scheme may be as follows.

First scheme: A scheme of reducing transmission power of all resources (resource blocks (RBs) or resource elements (REs) regardless of scheduling of a corresponding cell (serving cell)

Second scheme: A scheme of reducing the transmission power of the resource (RB or RE) corresponding to the UE configured to use the 256 QAM Third scheme: A scheme of reducing the transmission power of a resource (RB or RE) in which the 256 QAM is scheduled Hereinafter, the first to third schemes will be described in detail.

<First Scheme: Reducing Transmission Power of all Resources Regardless of Scheduling of Corresponding Cell>

When the modulator order is low (e.g., QPSK, 16QAM, and 64QAM), since an operating SINR region is relatively lower than the 256 QAM, the effective SINR by the power back-off may be decreased even though the EVM decreases, therefore, throughput performance may deteriorate.

Accordingly, a cell that performs the power back-off may be limited as a cell that may support the 256 QAM. In particular, such a case may be limited to a case in which even any one among the user equipments UEs associated with the corresponding cell (alternatively, serving cell) is configured to use the 256 QAM.

That is, when at least one terminal among the plurality of terminals which communicates with the serving cell is configured to use the 256 QAM, the power back-off may be applied.

It may be considered that whether to apply the power back-off to the corresponding cell is configured in the high layer and the base station (eNB) may signal to apply the power back-off to the corresponding cell to the user equipment (UE) or the terminal.

This may consider signaling using a ratio (PDSCH EPRE vs CRS EPRE ratio) between PDSCH EPRE and CRS EPRE which are signaled to the user equipment (UE) at present or configuring an EPRE ratio or configuring an offset for the PDSCH EPRE additionally in addition to the existing signaling.

In this case, the user equipment (UE) may estimate an amplitude for each modulation symbol during demodulation and decoding by using the EPRE ratio received from the base station.

In order to actually prevent the performance deterioration of the user equipment (UE) which does not use the 256 QAM, the configuration information for the power back-off may additionally include a subframe index, a frame index, a target resource (RB or RE), and a power reduction degree. In this case, the terminals (alternatively, terminals configured as such) supporting the 256QAM may assume that the power is reduced only in the allocated subframe, frame, or resource (RB or RE).

It may be assumed that the existing EPRE ratio is applied to other resources which are configured. A measurement subframe set may be divided in order to consider subframe sets having different power ratios. In the case of the existing terminal, it may be considered that CRS/PDSCH power is reduced by differently configuring the measurement subframe set.

The corresponding user equipment (UE) may perform demodulation, decoding, or CSI calculation based on whether the corresponding power is changed or a change degree during the demodulation, decoding, or CSI calculation.

A method for selecting the resource to which the power back-off is applied may be as follows.

—Method 1-1

The method 1-1 is a method in which the power back-off is performed with respect to all REs in the RB to which the power back-off is configured to be applied.

—Method 1-2

The Method 1-2 is a method in which the power back-off is performed with respect to all REs in a PDSCH interval except for a control region (e.g., PCFICH, PHICH, PDCCH, and EPDCCH) in the RB to which the power back-off is configured to be applied.

—Method 1-3

The Method 1-3 is a method in which the power back-off is performed in remaining regions acquired by excluding the control region (e.g., PCFICH, PHICH, PDCCH, and EPD-CCH) in the RB to which the power back-off is configured to be applied and excluding the cell specific signal (e.g., PSS/SSS, CRS, and PRS) in the PDSCH interval. In particular, a PBCH or a CSI-RS may be excluded from a power back-off target.

Figure 17:
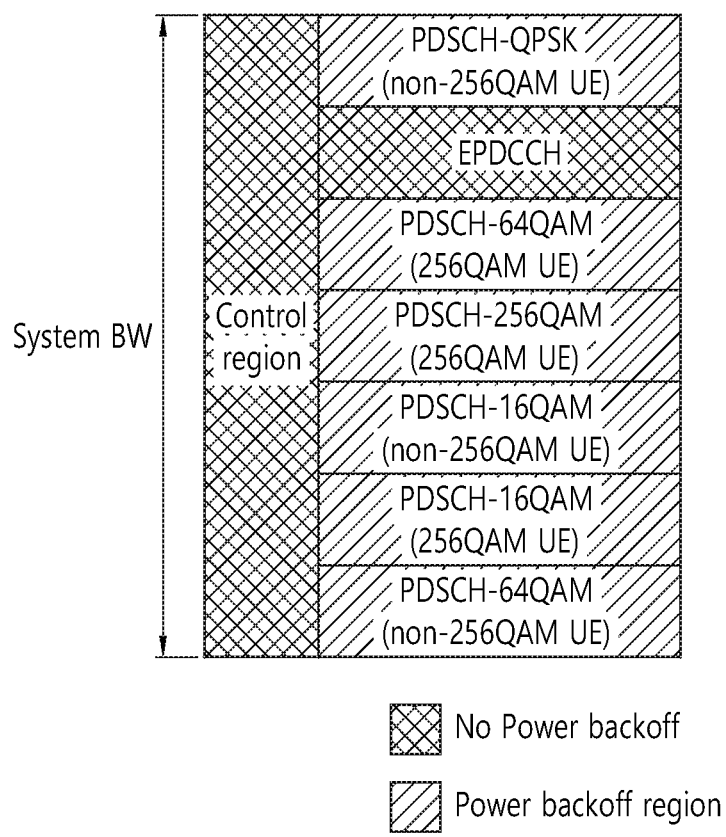
FIG. 17 illustrates one example of a power back-off target resource according to a first scheme.

FIG. 17 illustrates one example of a power back-off target resource according to a first scheme.

Referring to FIG. 17, the power back-off may be performed with respect to a partial BW according to the configuration for the power back-off in the high layer. In this case, it may be considered that the power back-off is performed with respect to a region constituted by RBs which do not correspond to the 256 QAM.

In this case, surplus power may be generated in a modulation scheme of an Rel-11 system which does not include the 256 QAM under a situation in which the channel environment is not good and the performance improvement (the increase of the effective SINR) may be achieved without reducing the power for the RBy using the 256 QAM through the power reduction.

In this case, the corresponding user equipment (UE) may appropriately select/estimate the amplitude for the modulation symbol during demodulation/decoding based on whether the power is reduced for each RB or RB group and a reduction degree.

<Second Scheme: Reducing Transmission Power of Resource Corresponding to User Equipment Configured to Use 256 QAM>

In order to prevent the performance deterioration by the power back-off for the user equipment (UE) which does not use the 256 QAM, only in the user equipment (UE) configured to use the 256 QAM, it may be considered that the transmission power in the RB allocated to the corresponding user equipment is reduced.

That is, even an RB which does not use the 256 QAM at a specific time, the power back-off is performed when the relevant RB corresponds to the user equipment (UE) configured to use the 256 QAM. In this case, there is a problem in that a level of the power to be reduced may vary depending on the number of allocated RBs corresponding to the user equipment (UE) configured to use the 256 QAM.

Since allocation for the corresponding RB may vary for each SF, it may be considered that the corresponding RB number (the RBs corresponding to the 256 QAM user equipment) is used as a parameter during DL power allocation.

As one example, a ratio (a PDSCH EPRE to cell-specific RS EPRE ratio) between the PDSCH EPRE and a cell-specific RS EPRE) needs to be designated or configured to be reduced in proportion to the number of RBs corresponding to the 256 QAM user equipment at the time of designating the PDSCH EPRE.

In this case, the user equipment (UE) may estimate the amplitude for each modulation symbol during demodulation and decoding by using information associated with the EPRE ratio or PDSCH EPRE associated information received from the base station. Similarly to the first scheme, the method for selecting the resource to which the power back-off is applied may be as follows.

—Method 2-1

The Method 2-1 is a method in which the power back-off is performed with respect to all REs in all allocated RBs corresponding to the 256 QAM user equipment (UE).

—Method 2-2

The Method 2-2 is a method in which the power back-off is performed with respect to all REs in a PDSCH interval except for the control region (e.g., PCFICH, PHICH, PDCCH, and EPDCCH) in all allocated RBs corresponding to the 256 QAM user equipment (UE).

—Method 2-3

The Method 2-3 is a method in which the power back-off is performed in remaining regions acquired by excluding the control region control region (e.g., PCFICH, PHICH, PDCCH, and EPDCCH) in all allocated RBs corresponding to the 256 QAM user equipment (UE) and excluding the cell specific signal (e.g., PSS/SSS, CRS, and PRS) in the PDSCH interval. In particular, the PBCH or CSI-RS may be excluded from the power back-off target.

Figure 18:
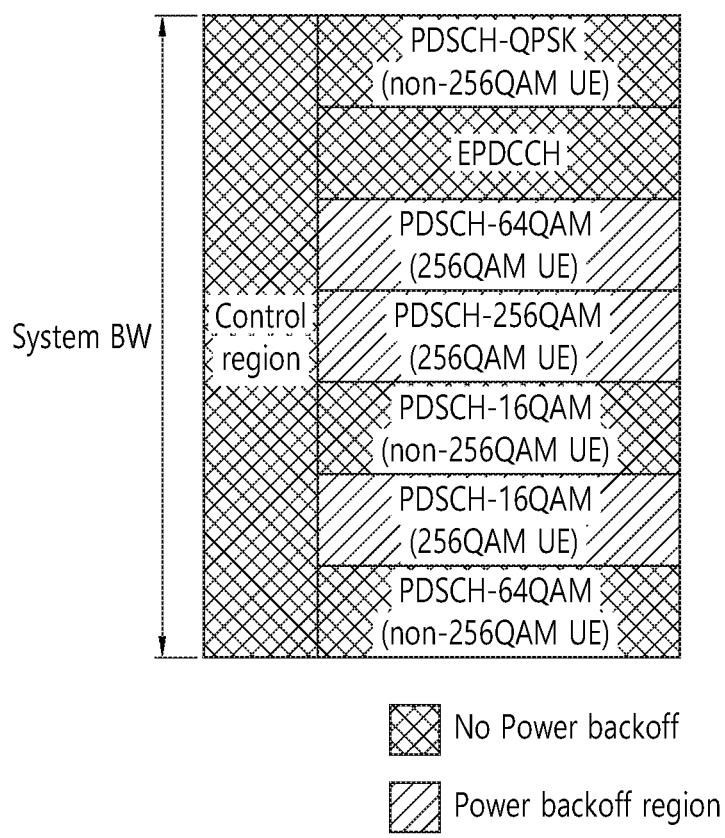
FIG. 18 illustrates one example of a power back-off target resource according to a second scheme.

FIG. 18 illustrates one example of a power back-off target resource according to a second scheme.

Referring to FIG. 18, it can be seen that the power back-off is performed with respect to the RB or partial BW corresponding to the user equipment configured to use the 256 QAM by the power back-off scheme according to the second scheme. However, the power back-off may not be performed with respect to the EPDCCH which is the control region.

Meanwhile, coordination among the 256 QAM user equipments (UEs) may not be assumed, therefore, ambiguity indicating how the power is reduced or configured may occur in each user equipment (UE).

In particular, when the CRS is excluded form the power back-off target, the information on the power configuration needs to be additionally provided to the 256 QAM user equipment (UE).

The user equipment (UE) may use the scheme during the demodulation, decoding, and the CSI calculation based on the information on the power configuration.

A method for providing the information on the power configuration according to the second scheme may be as follows.

—Method 2-A

The Method 2-A is a method in which contents or information on the power back-off is included in the corresponding PDCCH/EPDCCH at the time of allocating the 256 QAM.

In detail, a method may be considered, which reuses the existing DCI field so that a DCI field including the contents or information on the power back-off or the contents or information on the power back-off is included.

Further, using CRS masking for the PDCCH/EPDCCH may also be considered. In this case, the user equipment (UE) may perform the demodulation, decoding, and the CSI calculation based on the received information on the power configuration.

—Method 2-B

The Method 2-B is a method of simultaneously transmitting a DeModulation Reference Signal (DMRS) or the CSI-RS (alternatively, a new reference signal (RS) regardless of TM with respect to the 256 QAM user equipment (UE).

In particular, the power back-off is performed with respect to the corresponding RS similarly to the PDSCH and the user equipment (UE) may estimate power or the amplitude to be used during PDSCH demodulation/decoding based on the received RS. As another method, using the power back-off may be limited to a case of using DMRS based TM.

—Method 2-C

The Method 2-C is a method in which the base station provides the information (the power reduction degree) on the power back-off to each 256 QAM user equipment (UE) through a high layer signal.

The information or a value on the power back-off may be given assumed that the configured number of RBs is not actually changed. In this case, the user equipment (UE) may use the method during the demodulation, decoding, and the CSI calculation based on the received information on the power configuration.

Meanwhile, in the second scheme, the method in which the power back-off is performed only with respect to the 256 QAM user equipment (UE) is described, but extensively, a scheme that announces the power back-off or not, a power back-off method, and the like to the user equipment (UE) through the PDCCH/EPDCCH may be considered and the spirit of the present invention may be applied even to the corresponding scheme. As one example, a situation may be considered, in which the base station performs the power back-off with respect to the RBs allocated to the 256 QAM user equipment (UE) and the non-256 QAM user equipment (UE) and transmits the corresponding information included in the PDCCH/EPDCCH.

Actually, in this case, it may be considered that all RBs may be divided into RBs to which the power back-off is applied and RBs to which the power back-off is not applied from the viewpoint of the user equipment (UE), and as a result, actually, even though Pa is configured as one value, Pc for subband feedback is configured differently in parts to which the power back-off is applied and parts to which the power back-off is not applied or the user equipment (UE) configured to use the power back-off (256 QAM configuration) unconditionally calculates the CSI as a value acquired by assuming the power back-off. When different values are applied, in a configuration indicating which value is assumed while calculating a wideband CQI, Pc may be limited to the value acquired by assuming the power back-off.

When different Pc is configured in a subband CQI, it may be advantageous in that the corresponding terminal increases the CQI value when not applying the power back-off without being configured with the 256 QAM.

Since an interference level needs to decrease in order to use the 256 QAM, it may be useful to perform inter-cell coordination the RBs to be configured by the 256 QAM in advance. In this case, since the power needs to be transmitted while being decreased, interference needs to be further decreased and configuring relative narrowband transmit power (RNTP) may be used in order to decrease the interference level. Moreover, since modulation of the information, and the like may be assumed in performing data cancellation such as network assisted interference cancellation and suppression (NAICS), and the like, adjacent cells may schedule RBs designated for another cell to use by the 256 QAM to NAICS terminals with low power.

<Third Scheme: Reducing Transmission Power of Resource in which 256 QAM is Scheduled>

In extension of the second scheme, the third scheme is a scheme in which the power back-off of the corresponding RB is performed even with respect to the user equipment (UE) configured to use the 256 QAM only in a case in which the user equipment UE configured to use the 256 QAM is actually operated or scheduled by the 256 QAM.

A method for selecting the resource to which the power back-off is applied according to the third scheme may be as follows.

—Method 3-1

The Method 3-1 is a method in which the power back-off is performed with respect to all REs in all allocated RBs in which the 256 QAM is scheduled.

—Method 3-2

The Method 3-2 is a method in which the power back-off is performed with respect to all REs in the PDSCH interval except for the control region (e.g., PCFICH, PHICH, PDCCH, and EPDCCH) in all allocated RBs in which the 256 QAM is scheduled.

—Method 3-3

The Method 3-3 is a method in which the power back-off is performed in remaining regions acquired by excluding the control region control region (e.g., PCFICH, PHICH, PDCCH, and EPDCCH) in all allocated RBs in which the 256 QAM is scheduled. and excluding the cell-specific signal (e.g., PSS/SSS, CRS, and PRS) in the PDSCH interval. In particular, the PBCH or CSI-RS may be excluded from the power back-off target.

Figure 19:
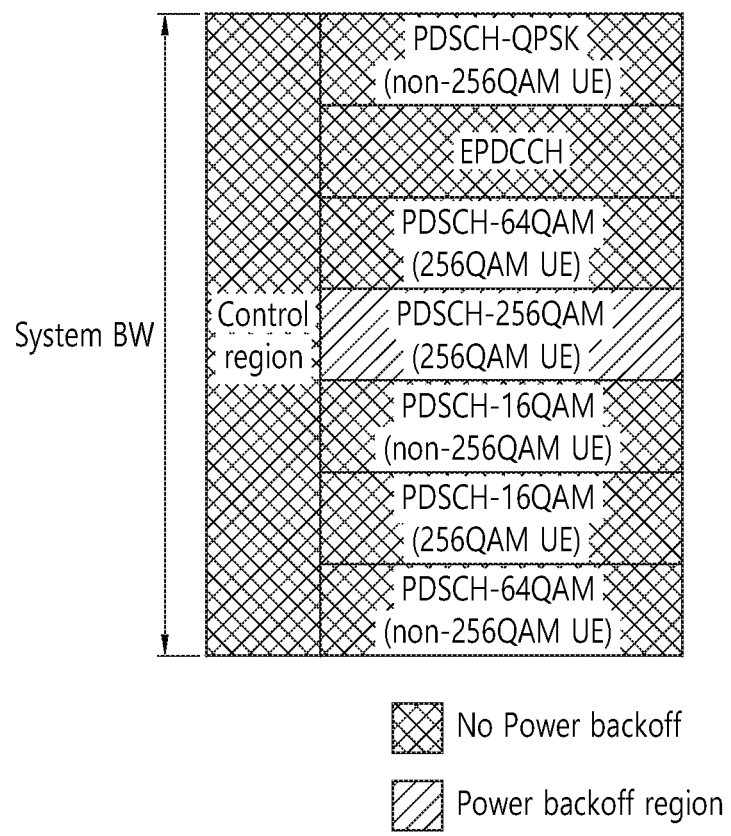
FIG. 19 illustrates one example of a power back-off target resource according to a third scheme.

FIG. 19 illustrates one example of a power back-off target resource according to a third scheme.

Referring to FIG. 19, it can be seen that the power back-off is performed with respect to the RB or partial BW scheduled by the 256 QAM in the power back-off scheme according to the third scheme. However, the power back-off may not be performed with respect to the EPDCCH which is the control region.

Meanwhile, the coordination among the 256 QAM user equipments (UEs) may not be assumed and it may not be immediately known the number of allocated RBs or whether to use the 256 QAM. Therefore, the ambiguity regarding how the power reduction or configuration is progressed may occur in each user equipment (UE). In particular, when the CRS is excluded form the power back-off target, the information on the power configuration needs to be additionally provided to the 256 QAM user equipment (UE).

A method for providing the information on the power configuration according to the third scheme may be as follows.

—Method 3-A

The Method 3-A is a method in which the contents or information on the power back-off is included in the corresponding PDCCH/EPDCCH at the time of allocating the 256 QAM.

In detail, the method may be considered, which reuses the existing DCI field so that the DCI field including the contents or information on the power back-off or the contents or information on the power back-off is included.

Further, using the CRC masking for the PDCCH/EPDCCH may also be considered.

When the Method 3-2 and the Method 3-3 are considered, a power back-off ratio/PRB may vary depending on how many actually allocated RBs and 256 QAM user equipments (UEs) are scheduled.

Therefore, a method which may send information such as a back-off ratio per PRB to the DCI may be considered. In this case, the user equipment (UE) may perform the demodulation, decoding, and the CSI calculation based on the received information on the power back-off.

—Method 3-B

The Method 3-B is a method of simultaneously transmitting the DeModulation Reference Signal (DMRS) or the CSI-RS (alternatively, the new reference signal (RS) regardless of the TM with respect to the 256 QAM user equipment (UE).

In particular, the power back-off is performed with respect to the corresponding RS similarly to the PDSCH and the user equipment (UE) may estimate power or the amplitude to be used during PDSCH demodulation/decoding based on the received RS. As another method, using the power back-off may be limited to the case of using the DMRS based TM.

—Method 3-C

The Method 3-C is a method in which the base station provides the information (the power reduction degree) on the power back-off to each 256 QAM user equipment (UE) through a high layer signal.

Since the value for the power back-off may vary depending on the number of scheduled RBs, an actual power back-off value may be calculated by the value received through the high layer signal and the number of scheduled RBs.

As one example, except for the allocated RBs, it is assumed that all RBs are scheduled by the non-256 QAM and the value for the power back-off may be calculated by an equation like min(max_power_backoff, higher_layer_signalled_backoff*(total RB#/assigned RB#).

This represents an operation of reducing the power in the scheduled RB as high as the power back-off is required. In this case, the user equipment (UE) may use the method during the demodulation, decoding, and the CSI calculation based on the received information on the power configuration.

FIG. 10 given below illustrates one example of a part which becomes a target of the power back-off of the Method 3.

<Additional Disclosure in this Specification—Downlink Power Allocation Parameters for Power Back-Off>

Hereinafter, as an additional disclosure in this specification, downlink power allocation parameters for power back-off will be described.

Power back-off may be performed equally in the entire subframes or performed only in some subframes according to the aforementioned schemes.

Further, when in the power back-off scheme, a PDSCH EPRE vs CRS EPRE ratio is set, a scheme of changing UE-specific assigned parameters may be considered and a scheme of changing equations to deduce the final corresponding ratio may be considered.

Herein, the PDSCH EPRE vs CRS EPRE ratio may be limited to the OFDM symbol without the CRS. When the power back-off amount is referred to as delta (dB), a method of changing the UE-specific assigned parameters is as follows.

—Scheme 4-1

Scheme 4-1 is a scheme of redefining an available value when reconfiguring UE-specific parameters (marked by p to a) used when setting the PDSCH EPRE vs CRS EPRE ratio.

For example, the range of the value may be a form of {−6-delta, −4.77-delta, −3-delta, −1.77-delta, −delata, 1-delta, 2-delta, 3-delta}. Alternatively, the range may consider a sum form of a range of existing values and a range of values considering the delta.

—Scheme 4-2

Scheme 4-2 is a scheme of adding values reduced by the power back-off when reconfiguring UE-specific parameters (marked by p to a) used when setting the PDSCH EPRE vs CRS EPRE ratio.

For example, the range of the value may be form of {delta', −6, −4.77, −3, −1.77, 0, 1, 2, 3}. Hereinabove, the delta' may be assigned as a value that is proportional to the final value of the power back-off.

The UE-specific parameter redefined above may be limited to a region that is the target of the power back-off according to the disclosure in this specification.

Alternatively, combining and using the existing parameter and the redefined parameter for each subframe may be considered through the setting in the high layer. Further, in the BS, signaling to the UE by adding the existing UE-specific parameters p to a and the parameters for power back-off may be considered and signaling the existing UE-specific parameters p to a and the delta value or the power back-off indications to the UE and interpreting the UE as the defined values in the region which is the target of the power back-off and the region set in the high layer may be considered.

Herein, the region which is the target of the power back-off may be limited to (1) all regions of a cell supporting 256QAM or a region signaled in the high layer, (2) a region signaled in the all regions of the cell while the US supporting the 256QAM is accessed or a region signaled in the high layer, (3) a subframe (SF)/RB region corresponding to the UE supporting the 256QAM, (4) a SF/RB region corresponding to the UE in which 256QAM is set, or (5) a SF/RB region in which the 256QAM is actually scheduled.

The corresponding UE may perform demodulating/decoding suitable for a reception signal based on the received information. Alternatively, the redefined parameter may consider that the existing parameters and the BS are simultaneously signaled, and in this case, the UE selects either the redefined parameter or the existing parameter to perform the EPRE estimation for the PDSCH and the decoding/demodulation.

Herein, the UE may be limited to (1) a case where the corresponding UE is scheduled in the scheduled region in the high layer, (2) a case where the corresponding UE sets the 256QAM, (3) a case where the corresponding UE sets the 256QAM and the 256QAM is actually scheduled, or (4) the corresponding UE is scheduled in the pre-assigned RB/SF region as a reference of selecting the redefined parameter.

As another scheme, redefining the used equation when setting the PDSCH EPRE vs CRS EPRE ratio may be considered. In this case, using the existing UE-specific parameters may be considered, and similarly, the redefined equation may be limited to a region which is the target of the power back-off according to the disclosure of the aforementioned specification and combining the existing equation and the redefined equation for each SF through the setting in the high layer may be considered.

An example of the redefined equation is as follows.

$\rho A$ may be calculated as $\rho A = \delta poweroffset + PA + 10 \log 10(2) - delta$ [dB] when the UE or the terminal receives PDSCH data transmission using precoding for transmission diversity of four cell-specific antenna ports according to section 6.3.4.3 of 3GPP TS 36.211, and $\rho A = \delta poweroffset + PA - delta$ [dB] in the remaining case. The $\delta poweroffset$ is a specific value and PA is a value given by the BS.

($\rho A$ is equal to $\rho A = \delta poweroffset + PA + 10 \log 10(2) - delta$ [dB] when the UE receives a PDSCH data transmission using precoding for transmit diversity with 4 cell-specific antenna ports according to Section 6.3.4.3 of [3]. $\rho A$ is equal to $\rho A = \delta poweroffset + PA - delta$ [dB] otherwise)

In the case of using the power back-off, it is effective that the power allocation for the OFDM symbol with the CRS and the power allocation for the OFDM symbol without the CRS are equally configured due to the entire power reduction. The reason is that a possibility to reduce the power at the PDSCH side for ensuring the CRS power may be reduced due to the power back-off.

Accordingly, setting independently PB by limiting the region (SF or SF/RB combination and the like) which is the target of the power back-off may be considered. More specifically, it may be considered that $\rho B/\rho A$ is set to 1 or PB is set to 0 by limiting the region of applying the power back-off.

<Another Additional Disclosure of this Specification—CSI Feedback for Power Back-Off>

Hereinafter, as another additional disclosure in this specification, CSI feedback for power back-off will be described.

In a scheme of performing power back-off with all or some of RB/REs for supporting 256QAM, a method of assigning a subframe set (SF set) to perform the power back-off through the high layer may be considered.

Another case of whether a neighboring cell performs the power back-off for each subframe in addition to the above case may be assumed, and accordingly, interference degree for each subframe with respect to the corresponding cell may vary.

More particularly, (1) a case where a target cell performs the power back-off and a neighboring cell performs the power back-off, (2) a case where the target cell does not perform the power back-off and the neighboring cell performs the power back-off, (3) a case where the target cell performs the power back-off and the neighboring cell does not perform the power back-off, and finally (4) both the target cell and the neighboring cell do not perform the power back-off may be considered.

Herein, the above cases need to be considered in the CSI feedback. With respect to the above interference environments, in order to support various CSI feedbacks, it may be considered to configure a plurality of CSI process, CSI-RS, channel-state information-interference measurement (CSI-IM), and the like, and it may be limited to the TM scheme.

Accordingly, only in the UE while using a 256QAM table or capable of using the 256QAM table, configuring additionally the CSI process or the CSI-RS/CSI-IM combination may be considered.

Further, as compared with a case where the power back-off is dynamically or in a long period of the corresponding pattern, configuring a plurality of CSI-IMs in the same CSI process may be considered.

The serving cell may pre-share basic or entire information for the power back-off with the neighboring cell, the CSI-RS, CSI-IM, and the like may be configured to the UE based on the corresponding information, and the UE may support reporting the CSI feedback to the serving cell in the four cases.

The serving cell may efficiently control the 256QAM scheduling and the power back-off through the corresponding CSI feedback.

As yet another scheme, setting the number of measurement sets only in the cell supporting the 256QAM to more than 2 may be considered.

For example, the serving cell may configure two CSI-RSs to the UE supporting the 256QAM. The first CSI-RS is used for measuring a channel for a case where the corresponding serving cell does not perform the power back-off, and the second CSI-RS may be used for measuring a channel for a case where the corresponding serving cell performs the power back-off.

Further, interference for a case where the neighboring cell performs the power back-off by configuring the plurality of CSI-IM resources and a case without using the power back-off may be measured.

In this case, the neighboring cell configures the CSI-RS which applies or not the power back-off according to the CSI-IM resources of the serving cell may be considered. In this case, it may be considered that the UE measures the CSI for all of four schemes or some thereof according to the setting and reports the corresponding result to the serving cell.

The serving cell may efficiently select whether 256QAM scheduling is performed according to each case with respect to the UE based on the reported CSI.

In the many CSI processes, when a plurality of measurement subframe sets or CSI-IMs are configured and a periodic CSI report is performed, in the CSI process, in the case of the measurement subframe set for each CSI process, a report for the plurality of measurement subframe sets to one CSI report may be performed.

For example, when current defined measurement subframe set 0 and subframe set 1 configure subframe set 0-0 and subframe set 0-1 and the subframe 1 configures subframe 1-0 and subframe 1-1, in the case where the CSI feedback for the subframe 0 rises, the reports for the subframe sets 0-0/0-1 may be simultaneously performed.

This is a differential CQI form, and the subframe set 0-1 or the subframe set 1-1 may be in a differential CQI form for the subframe set 0-0 or the subframe set 1-0.

In this case, a case of being configured as MIMI may not be used, and when the MIMO is configured, in the case of two or more specific sets, the periodic CSI report may be limited to be applied only to the two specific sets.

In the case of aperiodic CSI report, whether to use any specific set or use any CSI-IM may be assigned through the DCI. Alternatively, in the case of the aperiodic CSI report, the reports for all CSI-IMs or the specific sets (0-0/0-1 or 1-0/1-1) may be simultaneously reported.

Figure 20:
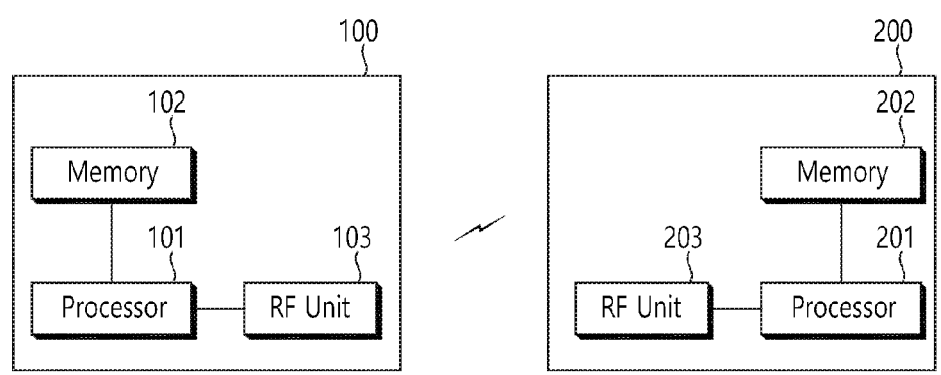
FIG. 20 is a block diagram illustrating a wireless communication system in which a disclosure of the present specification is implemented.

FIG. 20 is a block diagram illustrating a wireless communication system in which a disclosure of the present specification is implemented.

The base station 200 includes a processor 201, a memory 202, and a radio frequency (RF) unit 203. The memory 202 is connected with the processor 201 to store various pieces of information for driving the processor 201. The RF unit 203 is connected with the processor 201 to transmit and/or receive a radio signal. The processor 201 implements a function, a process, and/or a method which are proposed. In the aforementioned embodiment, the operation of the base station may be implemented by the processor 201.

An MTC device 100 includes a processor 101, a memory 102, and an RF unit 103. The memory 102 is connected with the processor 101 to store various pieces of information for driving the processor 101. The RF unit 103 is connected with the processor 101 to transmit and/or receive a radio signal. The processor 101 implements a function, a process, and/or a method which are proposed.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

A terminal according to a disclosure of the present specification as a terminal for receiving downlink data in a wireless communication system supporting 256 QAM includes: an RF unit receiving configuration information for power back-off and downlink data transmitted based on the configuration information for the power back-off; and a processor demodulating the received downlink data based on the configuration information for the power back-off, wherein the configuration information for the power back-off may be information associated with at least one of whether to apply the power back-off, a power reduction amount of the downlink by the power back-off, a frame index to which the power back-off is applied, a subframe index, and a resource to which the power back-off is applied.

Further, when at least one terminal among a plurality of terminals which communicates with a serving cell is configured to use the 256 QAM, the power back-off may be applied.

In addition, when the downlink data is downlink data transmitted to the terminal configured to use the 256 QAM among the plurality of terminals which communicates with the serving cell, the power back-off may be applied.

Moreover, when the downlink data is downlink data transmitted to the terminal which operates in the 256 QAM among the plurality of terminals which communicates with the serving cell, the power back-off may be applied.

Besides, the configuration information for the power back-off may be signaled by a high layer.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for receiving downlink data in a wireless communication system supporting 256 QAM, the method comprising:
   receiving configuration information for power back-off;
   receiving downlink control information (DCI) through a downlink control channel;
   receiving the downlink data transmitted based on the configuration information for the power back-off and the DCI; and
   demodulating the received downlink data based on the configuration information for the power back-off and the DCI,
   wherein the configuration information for the power back-off includes at least one of:
      information indicating whether to apply the power back-off, or
      information indicating a power reduction amount of the downlink by the power back-off,
   wherein a resource corresponding to the downlink control channel, among resources corresponding to the downlink data, is excluded from the power back-off.

2. The method of claim 1, wherein when at least one terminal among a plurality of terminals which communicates with a serving cell is configured to use the 256 QAM, the power back-off is applied.

3. The method of claim 1, wherein when the downlink data is downlink data transmitted to the terminal configured to use the 256 QAM among the plurality of terminals which communicates with the serving cell, the power back-off is applied.

4. The method of claim 1, wherein when the downlink data is downlink data transmitted to the terminal which operates in the 256 QAM among the plurality of terminals which communicates with the serving cell, the power back-off is applied.

5. The method of claim 1, wherein the configuration information for the power back-off is signaled by a high layer.

6. The method of claim 1, wherein the downlink control channel is at least one of a Physical Control Format Indicator Channel (PCFICH), a Physical Hybrid-ARQ Indicator Channel (PHICH), a Physical Downlink Control Channel (PDCCH), and an enhanced PDCCH (EPDCCH).

7. The method of claim 1, wherein the resource to which the power back-off is applied is a resource acquired by excluding a resource corresponding to a cell-specific signal from the resources corresponding to the downlink data.

8. The method of claim 7, wherein the cell-specific signal is be at least one of a Primary Synchronization Signal (PSS), a Secondary Synchronization Signal (SSS), a Cell-specific Reference Signal (CRS), and a Positioning Reference Signal (PRS).

9. A terminal for receiving downlink data in a wireless communication system supporting 256 QAM, the terminal comprising:
   an RF unit receiving configuration information for power back-off, downlink control information (DCI) through a downlink control channel, and downlink data transmitted based on the configuration information for the power back-off and the DCI; and
   a processor demodulating the received downlink data based on the configuration information for the power back-off and the DCI,
   wherein the configuration information for the power back-off includes at least one of:
      information indicating whether to apply the power back-off, or
      information indicating a power reduction amount of the downlink by the power back-off,
   wherein a resource corresponding to the downlink control channel, among resources corresponding to the downlink data, is excluded from the power back-off.

10. The terminal of claim 9, wherein when at least one terminal among a plurality of terminals which communicates with a serving cell is configured to use the 256 QAM, the power back-off is applied.

11. The terminal of claim 9, wherein when the downlink data is downlink data transmitted to the terminal configured to use the 256 QAM among the plurality of terminals which communicates with the serving cell.

12. The terminal of claim 9, wherein when the downlink data is downlink data transmitted to the terminal which operates in the 256 QAM among the plurality of terminals which communicates with the serving cell, the power back-off is applied.

13. The terminal of claim 9, wherein the configuration information for the power back-off is signaled by a high layer.

* * * * *